(12) United States Patent
Miki et al.

(10) Patent No.: US 9,157,523 B2
(45) Date of Patent: Oct. 13, 2015

(54) BICYCLE COMPONENT ACTUATION APPARATUS

(71) Applicant: Shimano Inc., Sakai, Osaka (JP)

(72) Inventors: Yoshimitsu Miki, Osaka (JP); Kentaro Kosaka, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 163 days.

(21) Appl. No.: 13/902,907

(22) Filed: May 27, 2013

(65) Prior Publication Data

US 2014/0345411 A1  Nov. 27, 2014

(51) Int. Cl.
*B62M 25/08* (2006.01)
*F16H 59/04* (2006.01)

(52) U.S. Cl.
CPC ........... *F16H 59/044* (2013.01); *Y10T 74/2003* (2015.01)

(58) Field of Classification Search
None
See application file for complete search history.

(56) References Cited

U.S. PATENT DOCUMENTS

| | | | |
|---|---|---|---|
| 7,373,232 B2 * | 5/2008 | Guderzo | 701/51 |
| 7,900,946 B2 * | 3/2011 | Hara et al. | 280/260 |
| 2005/0029772 A1 * | 2/2005 | Oi | 280/281.1 |
| 2005/0223840 A1 * | 10/2005 | Takamoto | 74/502.2 |
| 2010/0186538 A1 * | 7/2010 | Tetsuka | 74/501.6 |
| 2012/0253606 A1 * | 10/2012 | Takamoto et al. | 701/48 |
| 2013/0221713 A1 * | 8/2013 | Pelot et al. | 297/215.13 |

FOREIGN PATENT DOCUMENTS

TW  M415103 U  11/2011

* cited by examiner

*Primary Examiner* — John R Olszewski
*Assistant Examiner* — James M McPherson
(74) *Attorney, Agent, or Firm* — Global IP Counselors

(57) ABSTRACT

A bicycle component actuation apparatus basically comprises a base member; a user operating member and a controller. The user operating member is movably mounted to the base member from a rest position to a first operated position. The controller detects operation of the user operating member to operate first and second electric components, one of which is not a shifting device. The controller operates one of the first and second electric components upon the controller detecting the user operating member being moved to the first operated position. The controller operates at least the other of the first and second electric components upon the controller detecting the user operating member remaining at the first operated position for a period of time longer than a first prescribed time.

33 Claims, 14 Drawing Sheets

BICYCLE COMPONENT ACTUATION APPARATUS

BACKGROUND

1. Field of the Invention

This invention generally relates to a bicycle component actuation apparatus for controlling an operation of one or more bicycle components in response to operation of a user operating member.

2. Background Information

Bicycles are typically provided with one or more bicycle control devices that includes a user operating member that is manually operated to actuate one or more bicycle components. In the past, a shift operating wire connected the user operating member to the bicycle component so that manual operation of the user operating member actuated the bicycle component. More recently, bicycles have been equipped with electric bicycle components to make riding easier and more enjoyable for the rider. One example of a bicycle that is equipped with an electric bicycle component is disclosed in U.S. Pat. No. 7,900,946, which is assigned to Shimano Inc. In this patent, the bicycle is provided with a pair of shifters (i.e., bicycle control devices with user operating members) to operate a pair of derailleurs (i.e., a gear changing device) based on the movement of a pair of levers of the shifters.

SUMMARY

Generally, the present disclosure is directed to various features of a bicycle component actuation apparatus that is used for controlling an operation of one or more bicycle components in response to operation of a user operating member by a user (e.g., a rider).

In view of the state of the known technology and in accordance with one aspect of the present invention, a bicycle component actuation apparatus is provided that basically comprises a base member; a user operating member and a controller. The user operating member is movably mounted to the base member from a rest position to a first operated position. The controller detects operation of the user operating member to operate first and second electric components, one of which is not a shifting device. The controller operates one of the first and second electric components upon the controller detecting the user operating member being moved to the first operated position. The controller operates at least the other of the first and second electric components upon the controller detecting the user operating member remaining at the first operated position for a period of time longer than a first prescribed time.

In accordance with a second aspect of the present invention, the bicycle component actuation apparatus according to the first aspect is configured so that the controller operates both of the first and second electric components upon the controller detecting the user operating member remaining at the first operated position for a period of time longer than the first prescribed time.

In accordance with a third aspect of the present invention, the bicycle component actuation apparatus according to the first aspect is configured so that the controller operates only the other of the first and second electric components upon the controller detecting the user operating member remaining at the first operated position for a period of time longer than the first prescribed time.

In accordance with a fourth aspect of the present invention, the bicycle component actuation apparatus according to the first aspect is configured so that the controller includes a user input to adjust the first prescribed time, and a memory that stores user settings of the first prescribed time.

In accordance with a fifth aspect of the present invention, the bicycle component actuation apparatus according to the first aspect further comprises a movement detector mounted to at least one of the base member and the user operating member to detect operation of the user operating member. The controller receives a first detection signal from the movement detector upon the movement detector detects the user operating member has been moved from the rest position to the first operated position.

In accordance with a sixth aspect of the present invention, the bicycle component actuation apparatus according to the fifth aspect is configured so that the controller receives a second detection signal from the movement detector upon the controller detecting the user operating member remaining at the first operated position for a period of time longer than a first prescribed time.

In accordance with a seventh aspect of the present invention, the bicycle component actuation apparatus according to the sixth aspect is configured so that the first detection signal and the second detection signal are same signal.

In accordance with an eighth aspect of the present invention, the bicycle component actuation apparatus according to the first aspect is configured so that the user operating member is further movably mounted to the base member from the rest position to the first operated position and then to a second operated position in that order with a single progressive movement of the user operating member.

In accordance with a ninth aspect of the present invention, the bicycle component actuation apparatus according to the eighth aspect further comprises a movement detector mounted to at least one of the base member and the user operating member to detect operation of the user operating member. The controller receives a first detection signal from the movement detector upon the movement detector detects the user operating member has been moved from the rest position to the first operated position. The controller receives a second detection signal from the movement detector upon the controller detecting the user operating member remaining at the first operated position for a period of time longer than a first prescribed time. The controller receives a third detection signal from the movement detector upon detecting the user operating member has been moved from the first operated position to the second operated position.

In accordance with a tenth aspect of the present invention, the bicycle component actuation apparatus according to the ninth aspect is configured so that the controller outputs one of a first operation signal and a second operation signal upon receiving the first detection signal, and outputs other of the first and the second operation signals upon receiving the second detection signal.

In accordance with an eleventh aspect of the present invention, the bicycle component actuation apparatus according to the tenth aspect is configured so that the controller outputs a third operation signal upon receiving the third detection signal.

In accordance with a twelfth aspect of the present invention, the bicycle component actuation apparatus according to the eleventh aspect is configured so that the controller receives a fourth detection signal from the movement detector upon the controller detecting the user operating member remaining at the second operated position for a period of time longer than a second prescribed time.

In accordance with a thirteenth aspect of the present invention, the bicycle component actuation apparatus according to the twelfth aspect is configured so that the controller outputs a fourth operation signal upon receiving the fourth detection signal.

In accordance with a fourteenth aspect of the present invention, the bicycle component actuation apparatus according to the sixth aspect is configured so that the controller shifts an electric gear changing device by outputting one of a first operation signal and a second operation signal, and so that the controller changes a setting of at least one of a bicycle suspension, a height adjustable seat post and a rotational resistance applying structure of a rear derailleur by outputting the other of the first operation signal and the second operation signal.

In accordance with a fifteenth aspect of the present invention, the bicycle component actuation apparatus according to the sixth aspect is configured so that the controller changes a setting of one of a bicycle suspension, a height adjustable seat post and a rotational resistance applying structure of a rear derailleur as the one of the first and second electric components which is not the shifting device.

In accordance with a sixteenth aspect of the present invention, the bicycle component actuation apparatus according to the sixth aspect is configured so that the controller shifts a gear changing device as the other of the first and second electric components.

In accordance with a seventeenth aspect of the present invention, a bicycle component actuation apparatus is provided that basically comprises a base member, a user operating member and a controller. The user operating member is movably mounted to the base member from a rest position to a first operated position and then to a second operated position in that order with a single progressive movement of the user operating member. The controller detects operation of the user operating member to output first and second operation signals. The controller outputs a first operation signal upon the controller detecting the user operating member being moved to the first operated position. The controller outputs a second operation signal upon the controller detecting the user operating member remaining at the first operated position for a period of time longer than a first prescribed time. The controller outputs a third operation signal upon the controller detecting the user operating member being moved to the second operated position.

In accordance with an eighteenth aspect of the present invention, the bicycle component actuation apparatus according to the seventeenth aspect is configured so that the controller includes a user input to set an amount of movement of a gear changing device based on at least one of the first, second and third operation signals, and memory that stores user settings of the first, second and third operation signals.

In accordance with a ninth aspect of the present invention, the bicycle component actuation apparatus according to the seventeenth aspect is configured so that the controller includes a user input to adjust the first prescribed time, and memory that stores user settings of the first prescribed time.

In accordance with a twentieth aspect of the present invention, the bicycle component actuation apparatus according to the seventeenth aspect is configured so that controller changes a setting of at least one of an electric gear changing device, a bicycle suspension, a height adjustable seat post and a rotational resistance applying structure of a rear derailleur by outputting at least one of the first, second and third operation signals.

In accordance with a twenty-first aspect of the present invention, the bicycle component actuation apparatus according to the seventeenth aspect is configured so that the controller repeats outputting the second operation signal for each period of time that the user operating member remains at the first operated position for a period of time longer than the first prescribed time.

In accordance with a twenty-second aspect of the present invention, the bicycle component actuation apparatus according to the twenty-first aspect is configured so that the controller includes a user input to adjust the first prescribed time, and memory that stores user settings of the first prescribed time.

In accordance with a twenty-third aspect of the present invention, the bicycle component actuation apparatus according to the seventeenth aspect is configured so that the controller outputs a fourth operation signal upon the user operating member remains at the second operated position for longer than a second prescribed time.

In accordance with a twenty-fourth aspect of the present invention, the bicycle component actuation apparatus according to the seventeenth aspect is configured so that the controller changes a setting of at least one of an electric gear changing device, a bicycle suspension, a height adjustable seat post and a rotational resistance applying structure of a rear derailleur by outputting the first or second operation signal.

In accordance with a twenty-fifth aspect of the present invention, the bicycle component actuation apparatus according to the twenty-fourth aspect is configured so that the controller changes a setting of at least one of an electric gear changing device, a bicycle suspension, a height adjustable seat post and a rotational resistance applying structure of a rear derailleur by outputting the fourth operation signal.

In accordance with a twenty-sixth aspect of the present invention, the bicycle component actuation apparatus according to the twenty-third aspect is configured so that the controller includes a user input to adjust the second prescribed time, and memory that stores user settings of the second prescribed time.

In accordance with a twenty-seventh aspect of the present invention, the bicycle component actuation apparatus according to the twenty-third aspect is configured so that the controller repeats outputting the fourth operation signal for each period of time that the user operating member remains at the second operated position for the second prescribed time.

In accordance with a twenty-eighth aspect of the present invention, a bicycle component actuation apparatus is provided that basically comprises a base member, a user operating member and a controller. The user operating member is movably mounted to the base member from a rest position to a first operated position. The controller detects operation of the user operating member to operate first and second electric components. The controller operates one of the first and second electric components upon the controller detecting the user operating member remaining at the first operated position for a period of time equal to or less a prescribed time. The controller operates at least the other of the first and second electric components upon the controller detecting the user operating member remaining at the first operated position for a period of time longer than the prescribed time.

In accordance with a twenty-ninth aspect of the present invention, the bicycle component actuation apparatus according to the twenty-eighth aspect is configured so that the one of first and second electric components is not a shifting device.

In accordance with a thirtieth aspect of the present invention, the bicycle component actuation apparatus according to the twenty-eighth aspect is configured so that each of the first and second electric components is a shifting device.

In accordance with a thirty-first aspect of the present invention, a bicycle component actuation apparatus is provided that basically comprises a base member, a user operating member and a controller. The user operating member is movably mounted to the base member from a rest position to a first operated position and then to a second operated position in that order with a single progressive movement of the user operating member. The controller detects operation of the user operating member to output first and second operation signals. The controller outputs a first operation signal upon the controller detecting the user operating member remaining at the first operated position for a period of time equal to or less a first prescribed time. The controller outputs a second operation signal upon the controller detecting the user operating member remaining at the first operated position for a period of time longer than the first prescribed time. The controller outputs a third operation signal upon the controller detecting the user operating member being moved to the second operated position.

In accordance with a thirty-second aspect of the present invention, a bicycle component actuation apparatus is provided that basically comprises a base member, a user operating member and a controller. The user operating member is movably mounted to the base member from a rest position to a first operated position and then to a second operated position in that order with a single progressive movement of the user operating member. The controller detects operation of the user operating member to operate first and second electric components. The controller selectively outputs a first operation signal upon the controller detecting the user operating member being moved to the first operated position and a second operation signal without outputting the first operation signal upon the controller detecting the user operating member being moved to the second operated position.

In accordance with a thirty-third aspect of the present invention, the bicycle component actuation apparatus according to the first aspect is configured so that the controller operates one of a front derailleur and a rear derailleur as the first electric component, and operates the other of the front and rear derailleurs as the second electric component.

Various objects, features, aspects and advantages of the disclosed bicycle component actuation apparatus will become apparent to those skilled in the bicycle field from the following detailed description, which, taken in conjunction with the annexed drawings, discloses preferred embodiments of the bicycle component actuation apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
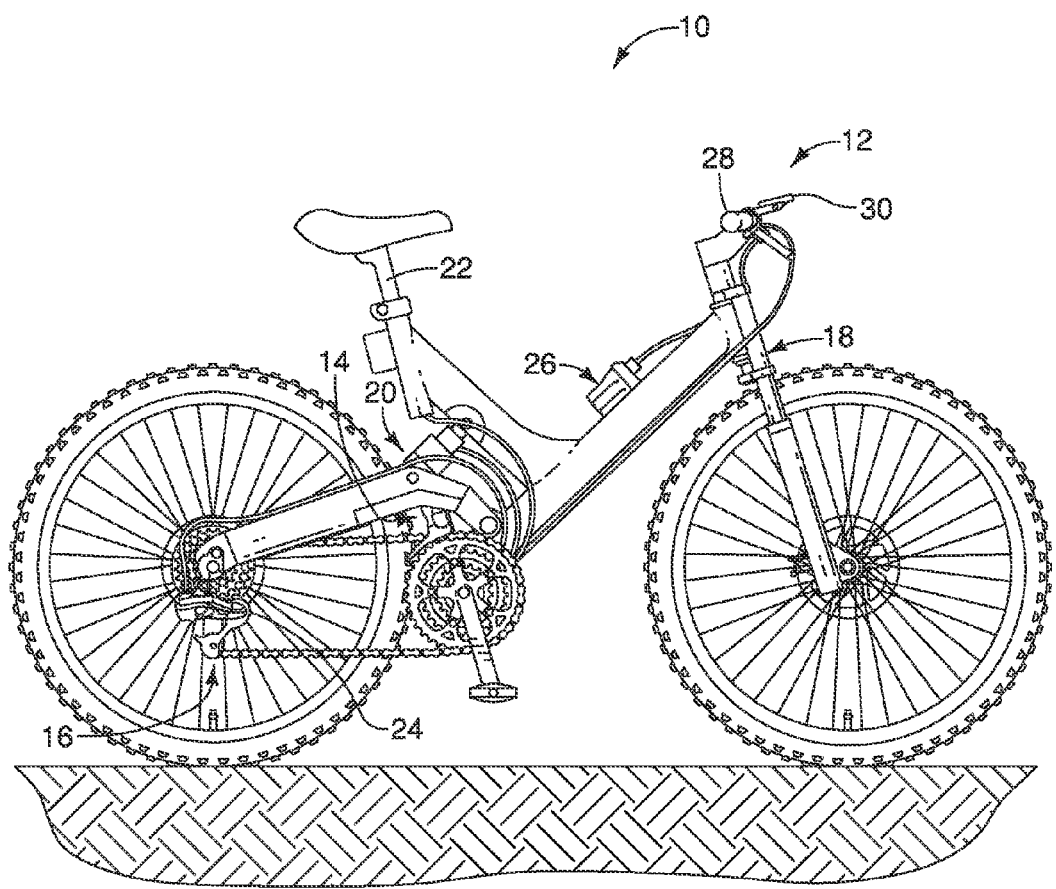
FIG. 1 is a side elevational view of a bicycle that is equipped with an bicycle component actuation apparatus in accordance with one embodiment.

Referring initially to FIG. 1, a bicycle 10 is illustrated that is equipped with a bicycle component actuation apparatus 12 for controlling a plurality of electric components in accordance with a first embodiment. In particular, the bicycle 10 includes, among other things, an electrically operated front derailleur 14, an electrically operated rear derailleur 16, an electrically adjustable front suspension 18, an electrically adjustable rear suspension 20 and an electrically adjustable seat post 22. Also the rear derailleur 16 preferably includes a rotational resistance applying structure 24 that adjust a rotational resistance force applied against the rotational of the chain cage of the rear derailleur 16. One example of a rotational resistance applying structure that is used with a bicycle rear derailleur is disclosed in U.S. patent application Ser. No. 12/895,705, which is assigned to Shimano Inc. The front derailleur 14 and the rear derailleur 16 are examples of gear changing devices. The front suspension 18, the rear suspension 20, the seat post 22 and the rotational resistance applying structure 24 are examples of non-shifting devices.

The bicycle 10 is preferably provided with a battery 26 as a main power source that supplies electrical power to the electric components 14, 16, 18, 20, 22 and 24. Alternatively, each of the electric components 14, 16, 18, 20, 22 and 24 can be provided with its own power source, or the bicycle can be provided with a generator for supplies electrical power to the electric components 14, 16, 18, 20, 22 and 24.

Figure 2:
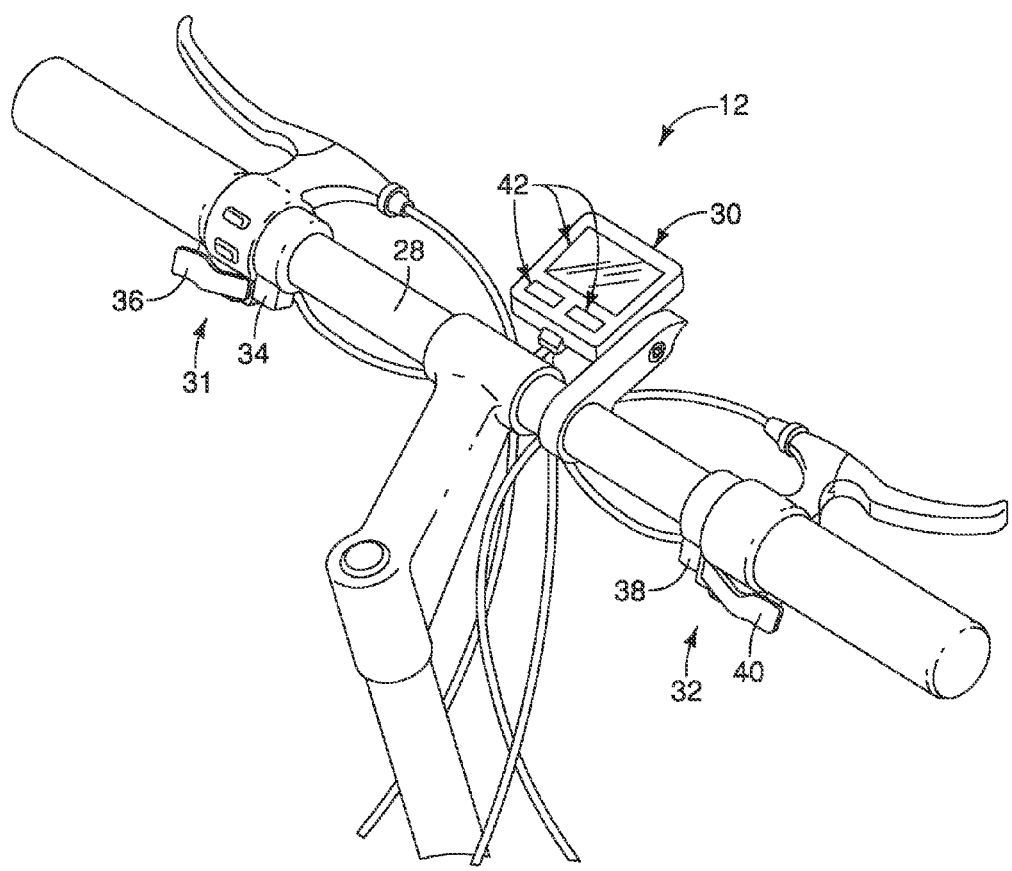
FIG. 2 is a perspective view of the a handlebar area of the bicycle illustrating a pair of bicycle control devices and a cycling computer coupled a handlebar of the bicycle illustrated in FIG. 1.

As seen in FIG. 2, in the illustrated embodiment, the bicycle component actuation apparatus 12 is mounted to a handlebar 28 of the bicycle 10. The bicycle component actuation apparatus 12 basically includes a controller 30 (e.g., cycle computer), a first bicycle control device 31 and a second bicycle control device 32. Basically, the first bicycle control device 31 has a first base member 34 and a first user operating member 36, while the second bicycle control device 32 has a second base member 38 and a second user operating member 40. While the bicycle component actuation apparatus 12 uses two bicycle control devices, the bicycle component actuation apparatus 12 could basically comprise a base member, a user operating member and a controller.

Figure 3:
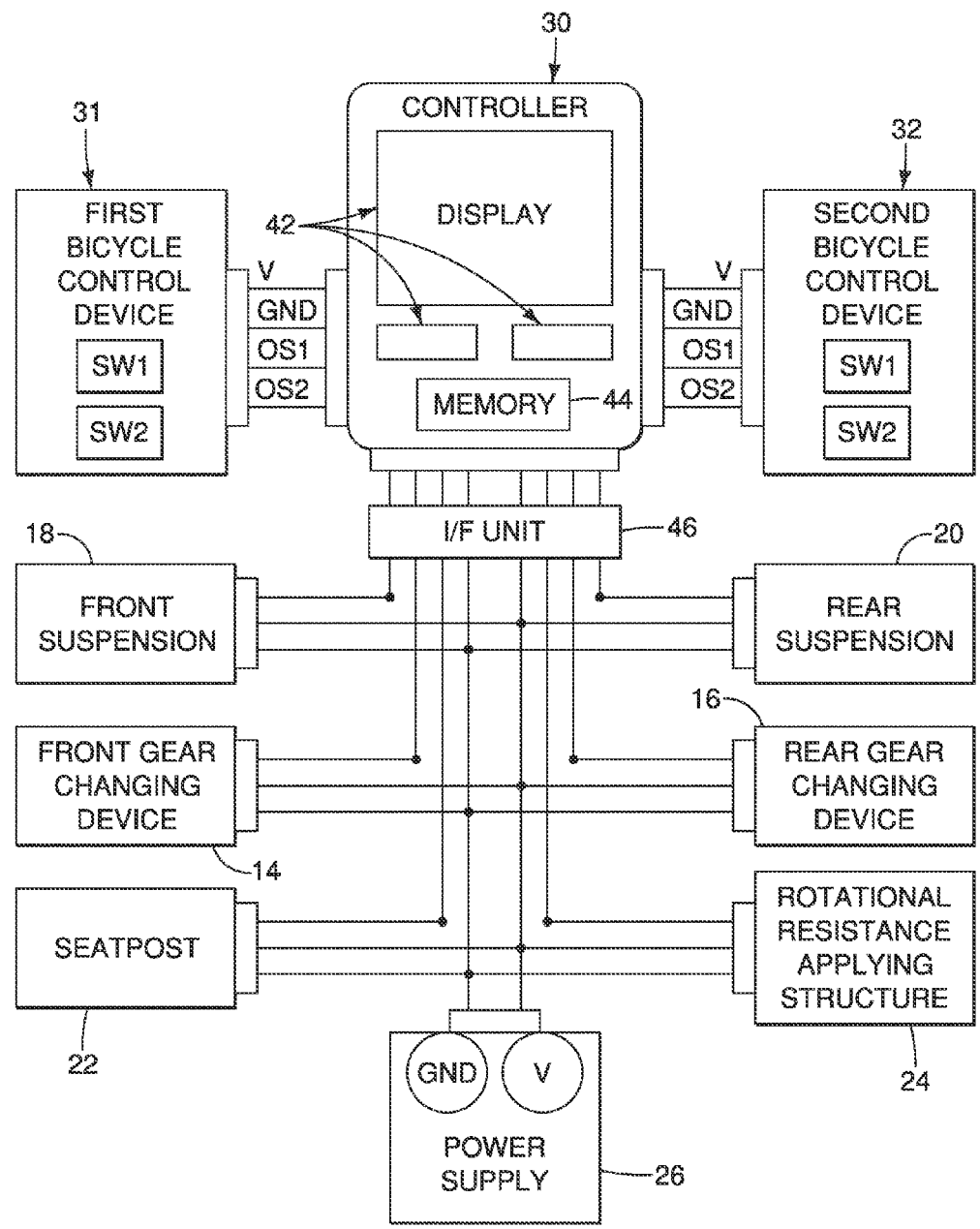
FIG. 3 is a schematic block diagram illustrating an overall configuration of an electric bicycle control system including the bicycle component actuation apparatus in accordance with the embodiment illustrated in FIGS. 1 and 2.
Figure 5:
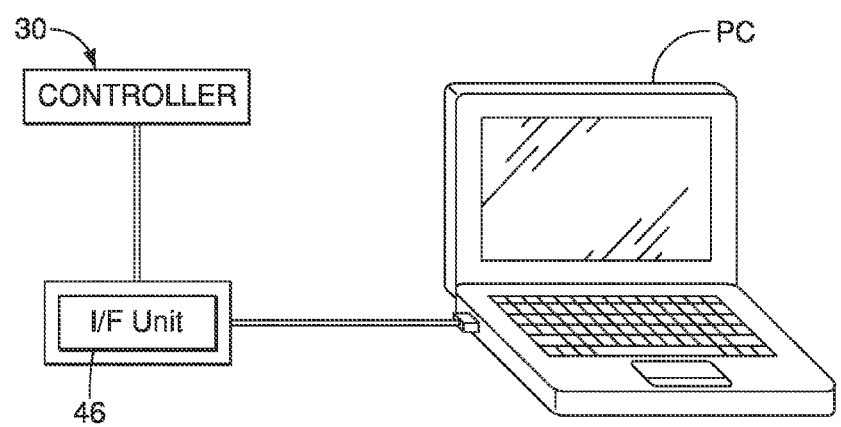
FIG. 5 is a simplified schematic diagram illustrating of the controller of the bicycle component actuation apparatus connected to an external computer for electrically adjusting various operating parameters (e.g., user settings) related to the actuation of the electric components by the operation of the user operating members.
Figure 6:
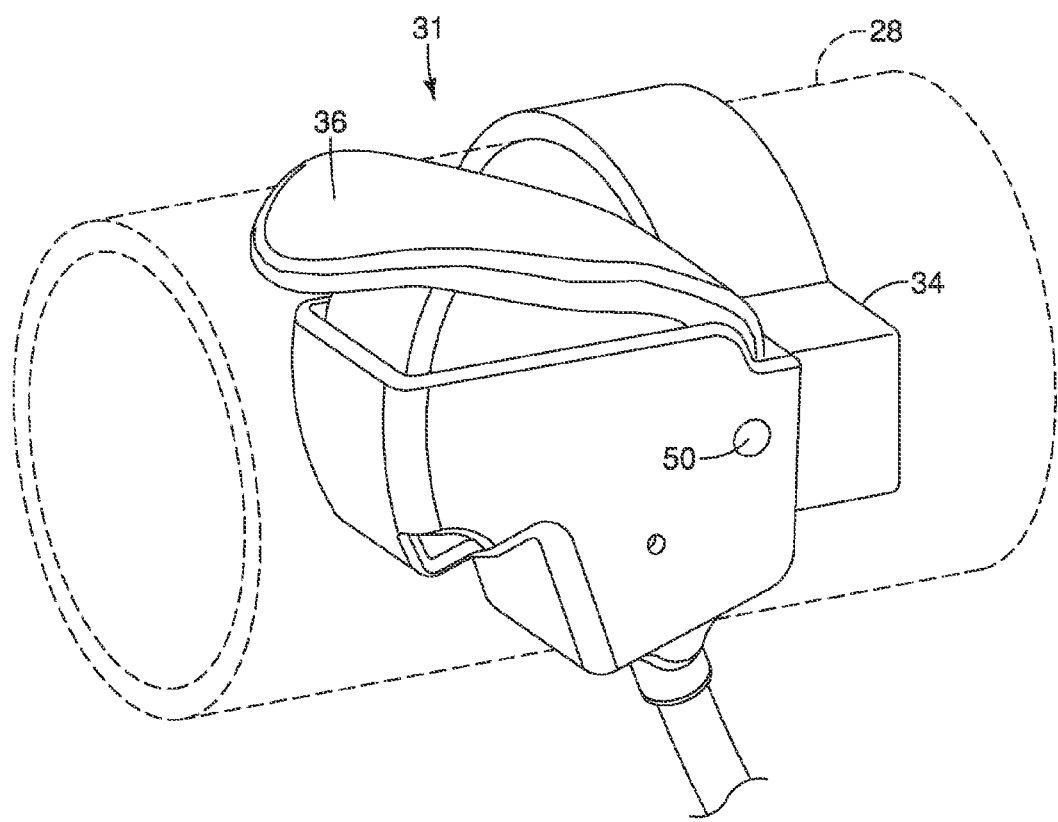
FIG. 6 is a perspective view of one of the bicycle control devices of the bicycle component actuation apparatus.
Figure 7:
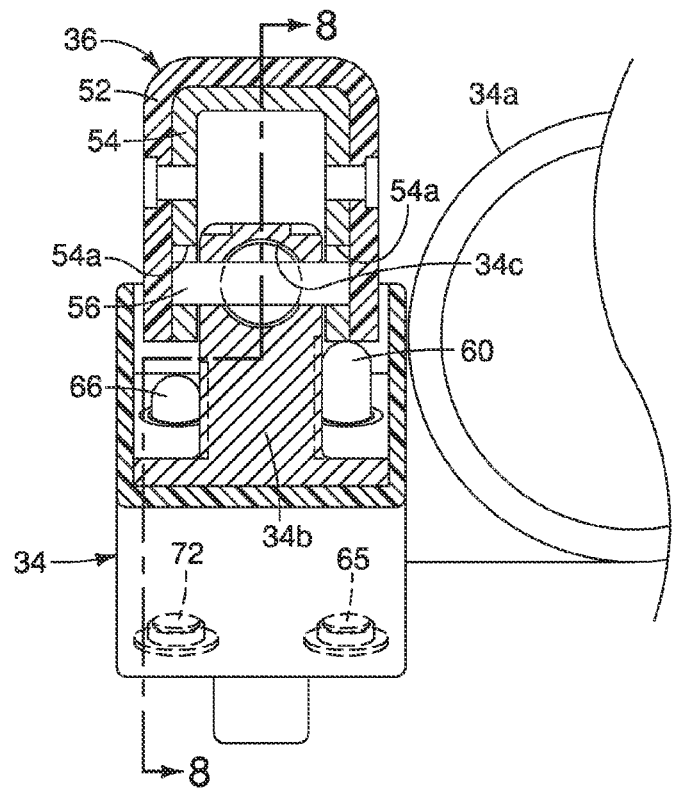
FIG. 7 is a transverse cross sectional view of the bicycle control device illustrated in FIG. 6.
Figure 8:
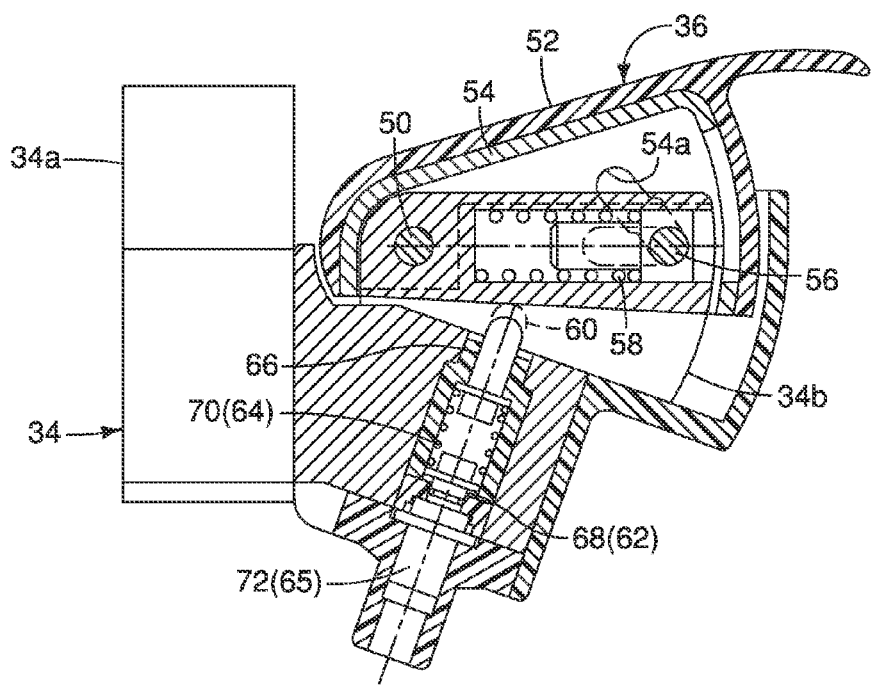
FIG. 8 is a cross sectional view of the bicycle control device illustrated in FIGS. 6 and 7 as viewed along a section line 8-8 of FIG. 75.

In the illustrated embodiment, as seen in FIG. 3, the controller 30 includes a user input 42 (i.e., a user interface) that includes a touch screen and a pair of input buttons. Also in the illustrated embodiment, as seen in FIG. 3, the controller 30 includes memory 44 that stores various user settings that were inputted via the user input 42 or by an external computer PC using an interface unit 46 as illustrated in FIG. 5. The controller 30 is basically a microcomputer that includes a central processing unit (CPU) and other conventional components such as an input interface circuit, an output interface circuit, and storage devices such as ROM (Read Only Memory) and RAM (Random Access Memory). The controller 30 can be provided with various control programs that control the electric components 14, 16, 18, 20, 22 and 24 and other components of the bicycle 10. Since each of the electric components 14, 16, 18, 20, 22 and 24 can be any conventional electric component, the electric components 14, 16, 18, 20, 22 and 24 will not be discussed in detail herein for the sake of brevity.

Here, the controller 30 is illustrated as a separate member that is electrically connected to the first and second bicycle control devices 31 and 32. Alternatively, the controller 30 can be integrated into either one of the first and second bicycle control devices 31 and 32, or each of the first and second bicycle control devices 31 and 32 can be provided with its own built-in cycle computer.

Figure 4:
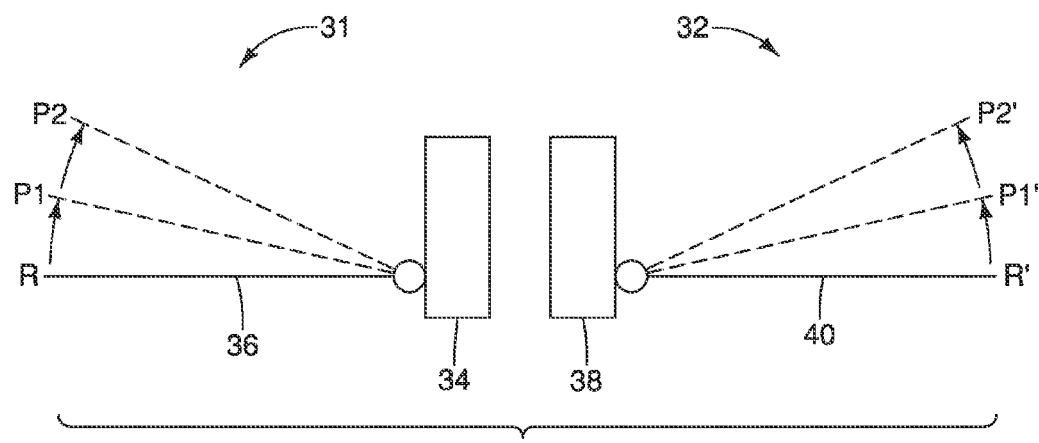
FIG. 4 is a schematic diagram of the bicycle control devices used in the bicycle component actuation apparatus in accordance with the embodiment illustrated in FIGS. 1 and 2.

Referring to FIGS. 3 and 4, an overview of the bicycle component actuation apparatus 12 will be now be discussed. In the illustrated embodiment, as seen in FIG. 3, each of the first and second bicycle control devices 31 and 32 has a first movement detector SW1 (e.g., a first switch) and a second movement detector SW2 (e.g., a second switch). The first and second movement detectors SW1 and SW2 of the first bicycle control device 31 are mounted to at least one of the first base member 34 and the first user operating member 36 to detect operation of the first user operating member 36. Likewise, the first and second movement detectors SW1 and SW2 of the second bicycle control device 32 are mounted to at least one of the second base member 38 and the second user operating member 40 to detect operation of the second user operating member 40.

As seen in FIG. 4, the first user operating member 36 is movably mounted to the first base member 34 from a rest position R to a first operated position P1. The first user operating member 36 is further movably mounted to the first base member 34 from the rest position R to the first operated position P1 and then to a second operated position P2 in that order with a single progressive movement of the first user operating member 36.

Likewise, the second user operating member 40 is movably mounted to the second base member 38 from a rest position R' to a first operated position P1'. The second user operating member 40 is further movably mounted to the second base member 38 from the rest position R' to the first operated position P1 and then to a second operated position P2' in that order with a single progressive movement of the second user operating member 40. While each of the first and second bicycle control devices 31 and 32 includes two movement detectors, each of the first and second bicycle control devices 31 and 32 can be configured with only one movement detector if needed and/or desired.

The controller 30 can be set by a user such that the first and second bicycle control devices 31 and 32 can be used to operate the electric components 14, 16, 18, 20, 22 and 24 based on whether the operation amount and/or the amount of time that the first user operating member 36 and/or the second user operating member 40 is operated. The controller 30 can be set by the user such that the first user operating member 36 can be used to operate two (first and second) electric components.

In a basic configuration of the bicycle component actuation apparatus 12, only the first movement detectors SW1 of the first and second bicycle control devices 31 and 32 are used to control to operate the electric components 14, 16, 18, 20, 22 and 24. In other words, in this basic configuration, only the amount of time (e.g., a short operation or a long operation) that the first user operating member 36 and/or the second user operating member 40 is operated is used to control the electric components 14, 16, 18, 20, 22 and 24.

Basically, in this basic configuration, the controller 30 operates one of the first and second electric components upon the controller 30 detecting the first user operating member 36 remains at the first operated position P1 for a period of time equal to or less a prescribed time. The controller 30 then outputs a first operation signal upon the controller 30 detecting the user operating member 36 remains at the first operated position P1 for a period of time equal to or less a first prescribed time. The controller 30 operates at least the other of the first and second electric components upon the controller 30 detecting the first user operating member 36 remains at the first operated position P1 for a period of time longer than the prescribed time. The controller 30 then outputs a second operation signal upon the controller 30 detecting the user operating member 36 remains at the first operated position P1 for a period of time longer than the first prescribed time.

Some examples of user settings for this basic configuration will be shown in the following tables. Of course, it will be apparent to those skilled in the bicycle field from this disclosure that other user settings are possible.

First User Setting

| | First Operated Position Short Operation | First Operated Position Long Operation |
|---|---|---|
| First User Operating Member | Change Rear Derailleur One Shift Stage (e.g., downshift) | Change Front Derailleur One Shift Stage (e.g., downshift) |
| Second User Operating Member | Change Rear Derailleur One Shift Stage (e.g., upshift) | Change Front Derailleur One Shift Stage (e.g., upshift) |

Second User Setting

|  | First Operated Position Short Operation | First Operated Position Long Operation |
|---|---|---|
| First User Operating Member | Change rear derailleur one shift stage (e.g., downshift) | Change rear derailleur one shift stage (e.g., downshift); and Change front derailleur one shift stage (e.g., upshift) |
| Second User Operating Member | Change rear derailleur one shift stage (e.g., upshift) | Change rear derailleur one shift stage (e.g., upshift); and Change Front derailleur one shift stage (e.g., downshift) |

In these first and second user settings, each of the first and second electric components is a shifting device. With this setting, the controller 30 operates one of the front derailleur 14 and the rear derailleur 16 as the first electric components, and operates the other of the front and rear derailleurs 14 and 16 as the second electric components. As explained below, the controller 30 outputs one of a first operation signal and a second operation signal upon receiving the first detection signal, and outputs other of the first and the second operation signals upon receiving the second detection signal. For these first and second user settings, the controller 30 can operate the selected electric components using one of the control processes of FIGS. 11 and 12.

In these first and second user settings, the controller 30 operates one of the first and second electric components upon the controller 30 detecting the user operating member 36 remains at the first operated position P1 for a period of time equal to or less than a first prescribed time, and the controller at least the other of the first and second electric components upon the controller 30 detecting the user operating member 36 remains at the first operated position P1 for a period of time longer than the first prescribed time. In the first user setting, the controller 30 operates only the other of the first and second electric components upon the controller 30 detecting the user operating member 36 remains at the first operated position P1 for a period of time longer than the first prescribed time. The controller 30 includes the user input 42 to adjust the first prescribed time, and the memory 44 to store the user settings of the first prescribed time.

As mentioned above, the first and second bicycle control devices 31 and 32 can be used to control shifting and adjust a non-shifting device of the bicycle 10. The controller 30 changes a setting of one of a bicycle suspension, a height adjustable seat post and a rotational resistance applying structure of a rear derailleur as the one of the first and second electric components which is not the shifting device.

Third User Setting

|  | First Operated Position Short Operation | First Operated Position Long Operation |
|---|---|---|
| First User Operating Member | Change gear changing device (e.g., one or both of the derailleurs one shift stage such as downshift) | Change non-shifting device (e.g., Suspension - free state, lockout state, high stiffness, medium stiffness, or low stiffness; or Seatpost -high position, medium position, or low position; or rotational resistance applying structure - high resistance state or low resistance state) |
| Second User Operating Member | Change gear changing device (e.g., one or both of the derailleurs one shift stage such as upshift) | Change non-shifting device (e.g., Suspension - free state, lockout state, high stiffness, medium stiffness, or low stiffness; or Seatpost -high position, medium position, or low position; or rotational resistance applying structure - high resistance state or low resistance state) |

Fourth User Setting

|  | First Operated Position Short Operation | First Operated Position Long Operation |
|---|---|---|
| First User Operating Member | Change gear changing device (e.g., one or both of the derailleurs) one shift stage (e.g., downshift) | Change gear changing device (e.g., one or both of the derailleurs) one shift stage (e.g., downshift); and Change suspension (e.g., a free state, lockout state, high stiffness, medium stiffness, or low stiffness) |
| Second User Operating Member | Change gear changing device (e.g., one or both of the derailleurs) one shift stage (e.g., upshift) | Change gear changing device (e.g., one or both of the derailleurs) one shift stage (e.g., upshift); and Change suspension (e.g., a free state, lockout state, high stiffness, medium stiffness, or low stiffness) |

In these third and fourth user settings, the one of first and second electric components is not a shifting device. For example, the controller 30 detects operation of the first user operating member 36 to operate the first and second electric components, one of which is not a shifting device. The controller 30 shifts a gear changing device as the other of the first and second electric components. In other words, the first user operating member 36 can be used to operate one of the non-shifting devices (e.g., the front suspension 18, the rear suspension 20, the seat post 22 and the rotational resistance applying structure 24) and one of the gear changing devices (e.g., the front derailleur 14 and the rear derailleur 16). For these third and fourth user settings, the controller 30 can operate the selected electric components using one of the control processes of FIGS. 11 and 12. In the case of the fourth user setting, by using the control process of FIG. 12, the controller 30 selectively outputs a first operation signal upon the controller 30 detecting the user operating member 36 being moved to the first operated position P1 for a period of time equal to or less than the first prescribed period, and a second operation signal without outputting the first operation signal upon the controller 30 detecting the first user operating member 36 remains at the first operated position P1 for a period of time longer than the first prescribed period.

As explained below with reference to the control processes of FIGS. 11 and 12, the controller 30 shifts an electric gear changing device (e.g., the front derailleur 14 and the rear derailleur 16) by outputting one of a first operation signal and a second operation signal, and the controller 30 changes a setting of at least one of the bicycle suspension (e.g., the front suspension 18 and/or the rear suspension 20), a height adjustable seat post (e.g., the seat post 22) and a rotational resistance applying structure (e.g., the rotational resistance applying structure 24) of the rear derailleur 16 by outputting the other of the first operation signal and the second operation signal.

In the illustrated embodiment, in case of the operation of the first user operating member 36 to the first operated position P1, the controller 30 receives a first detection signal from the first movement detector SW1 upon the first movement detector SW1 detecting the first user operating member 36 has been moved from the rest position R to the first operated position P1. If the first user operating member 36 remains at the first operated position P1 for a period of time equal to or less than a first prescribed time, then the controller 30 outputs a first operation signal in response to receiving the first detection signal. As explained below, also the controller 30 receives a second detection signal from the first movement detector SW1 upon the controller 30 detecting the first user operating member 36 remains at the first operated position P1 for a period of time longer than the first prescribed time. In the illustrated embodiment, the controller 30 determines the detection signal from the first movement detector SW1 corresponds to the second detection signal upon the controller 30 determining the first user operating member 36 remains at the first operated position P1 for a period of time longer than the first prescribed time. If the first user operating member 36 remains at the first operated position P1 for a period of time longer than the first prescribed time, then the controller 30 outputs a second operation signal in response to receiving the second detection signal.

The memory 44 can have a default setting for the first prescribed time. However, preferably, the user input 42 can be used to adjust the first prescribed time from the default setting to a desired length of time as needed and/or desired. The memory 44 stores user settings of the first prescribed time. Since the first movement detector SW1 is used for detecting both the first user operating member 36 reaching the first operated position P1 and the amount of time that the first user operating member 36 is held at the first operated position P1, the first detection signal and the second detection signal are the same signal that is received by the controller 30. The controller 30 distinguishes the first and second detection signals based on the amount of time that the first movement detector SW1 sends a signal to the controller 30. The controller 30 detects operation of the user operating member 36 based on the first and second detection signals and outputs first and second operation signals to actuate one or more of the electric components 14, 16, 18, 20, 22 and 24 in accordance with the user settings that are stored in the memory 44. In particular, the controller 30 outputs the first operation signal upon the controller 30 detecting the user operating member 36 being moved to the first operated position P1. The controller 30 outputs the second operation signal controller 30 upon the controller 30 detecting the user operating member 36 remaining at the first operated position for a period of time longer than a first prescribed time.

In case of the operation of the first user operating member 36 from the first operated position P1 to the second operated position P2, the controller 30 receives a third detection signal from the second movement detector SW2 upon detecting the first user operating member 36 has been moved from the first operated position P1 to the second operated position P2. The controller 30 outputs a third operation signal upon receiving the third detection signal. More specifically, if the first user operating member 36 remains at the second operated position P2 for a period of time equal to or less than a second prescribed time, then the controller 30 outputs a third operation signal in response to receiving the first detection signal. Stated differently, the controller 30 outputs a third operation signal upon the controller 30 detecting the user operating member 36 being moved to the second operated position P2. As explained below, also the controller 30 receives a fourth detection signal from the second movement detector SW2 upon the controller 30 detecting the first user operating member 36 remains at the second operated position P2 for a period of time longer than the second prescribed time. In the illustrated embodiment, the controller 30 determines the detection signal from the second movement detector SW2 corresponds to the fourth detection signal upon the controller 30 determining the first user operating member 36 remains at the second operated position P2 for a period of time longer than the second prescribed time. The controller 30 outputs a fourth operation signal upon receiving the fourth detection signal. More precisely, the controller 30 outputs the fourth operation signal upon determining that the user operating member 36 remains at the second operated position P2 for longer than a second prescribed time.

The memory 44 can have a default setting for the second prescribed time. However, preferably, the user input 42 can be used to adjust the second prescribed time from the default setting to a desired length of time as needed and/or desired. The memory 44 stores the user settings of the second prescribed time. The user input 42 can be used to set an amount of movement of a gear changing device or a non-shifting device based on at least one of the first, second, third and fourth operation signals, and the memory 44 stores the user settings of the first, second, third and fourth operation signals. Also as discussed below in the control processes of FIGS. 13 to 16, the controller 30 changes a setting of at least one of an electric gear changing device, a bicycle suspension, a height adjustable seat post and a rotational resistance applying structure of a rear derailleur by outputting at least one of the first, second, third and fourth operation signals.

The second bicycle control device 32 is identical the first bicycle control device 31, except that the second bicycle control device 32 is a mirror image of the first bicycle control device 31. Likewise, in case of the operation of the second user operating member 40, the controller 30 also receives the first and second detection signals from the first movement detector SW1 and the third and fourth detection signals from the second movement detector SW2 in the same manner as discussed above with respect to the first bicycle control device 31. Of course, how and which of the electric components 14, 16, 18, 20, 22 and 24 are controlled by the second bicycle control device 32 can be different from the first bicycle control device 31. Thus, only the second bicycle control device 32 will not be described and illustrated in further detail herein.

Now, in the following tables, some additional examples of user settings are presented that are especially useful for a user operating member that has two operated positions such as the first and second bicycle control devices 31 and 32. Of course, it will be apparent to those skilled in the bicycle field from this disclosure that other user settings are possible.

Fifth User Setting

|  | Short Operation | Long Operation |
|---|---|---|
| First Operated Position | Change one shift stage (e.g., upshift or downshift) | After changing one shift stage, change shift stage one by one based on the time the user operating member is maintained at the first operated position (e.g., upshift or downshift) |

Sixth User Setting

|  | Short Operation | Long Operation |
|---|---|---|
| Second Operated Position | Change one shift stage (e.g., upshift or downshift) | After changing one shift stage, change shift stage one by one based on the time the user operating member is maintained at the second position (e.g., upshift or downshift) |

Sixth User Setting

|  | Short Operation | Long Operation |
|---|---|---|
| First Operated Position | Change one shift stage (e.g., upshift or downshift) | Change two shift stages (e.g., upshift or downshift) |
| Second Operated Position | Change one shift stage (e.g., upshift or downshift) | Change two shift stages (e.g., upshift or downshift) |

Seventh User Setting

|  | Short Operation | Long Operation |
|---|---|---|
| First Operated Position | Change front derailleur one shift stage (e.g., upshift or downshift) | After changing front derailleur one shift stage, change rear derailleur shift stage (e.g., upshift or downshift) |
| Second Operated Position | Change rear derailleur one shift stage (e.g., upshift or downshift) | After changing rear derailleur one shift stage, change front derailleur shift stage (e.g., upshift or downshift) |

Eighth User Setting

|  | Short Operation | Long Operation |
|---|---|---|
| First Operated Position | Change one of the shifting devices by one shift stage (e.g., upshift or downshift) | After changing the shifting device by one shift stage, change the shifting device by changing shift stage one by one based on the time the user operating member is maintained at the first operated position (e.g., upshift or downshift) |
| Second Operated Position | Change status of one of the non-shifting devices (e.g., change suspension to one of a free state, a lockout state, a high stiffness, a medium stiffness, and a low stiffness; or change height adjustable seatpost to one of a high position, a low position; or change rear derailleur with rotational resistance applying structure to one of a high resistance state, and a low resistance state) | Change status of one of the non-shifting devices (e.g., change suspension to one of a free state, a lockout state, a high stiffness, a medium stiffness, and a low stiffness; or change height adjustable seatpost to one of a high position, a low position; or change rear derailleur with rotational resistance applying structure to one of a high resistance state, and a low resistance state) |

Ninth User Setting

|  | Short Operation | Long Operation |
|---|---|---|
| First Operated Position | Change status of one of the non-shifting devices (e.g., change suspension to one of a free state, a lockout state, a high stiffness, a medium stiffness, and a low stiffness; or change height adjustable seatpost to one of a high position, a low position; or change rear derailleur with rotational resistance applying structure to one of a high resistance state, and a low resistance state) | After changing the shifting device by one shift stage, change the shifting device by changing shift stage one by one based on the time the user operating member is maintained at the first operated position (e.g., upshift or downshift) |
| Second Operated Position | Change one of the shifting devices by one shift stage (e.g., upshift or downshift) | After changing the shifting device by one shift stage, change the shifting device by changing shift stage one by one based on the time the user operating member is maintained at the second position (e.g., upshift or downshift) |

In these examples, the controller 30 changes a setting of at least one of an electric gear changing device, a bicycle suspension, a height adjustable seat post and a rotational resistance applying structure of a rear derailleur by outputting the first second operation signal and/or the second operation signal, and changes a setting of at least one of an electric gear changing device, a bicycle suspension, a height adjustable seat post and a rotational resistance applying structure of a rear derailleur by outputting the third operation signal and/or the fourth operation signal. The controller 30 can controls two of electronic components at once after the controller 30 determines the operation is short push or a long push depending on the user settings.

Also it will be apparent to those skilled in the bicycle field from this disclosure that the first and second bicycle control devices 31 and 32 are not limited to the illustrated embodiment. Rather, the bicycle control devices of the bicycle component actuation apparatus 12 can have a variety of configurations. For example, the bicycle control devices of the bicycle component actuation apparatus 12 can each have a pair of user operating members such as disclosed in U.S. Pat. No. 7,900,946, which is assigned to Shimano Inc. Also for example, the bicycle control devices of the bicycle component actuation apparatus 12 can be formed as road shifters with each road shifters having a pair of user operating members such as disclosed in U.S. Patent Application Publication No. 2010/0186538, which is assigned to Shimano Inc. Moreover, the operating members of the bicycle control devices of the bicycle component actuation apparatus 12 is not limited to pivotally mounted levers as illustrated. For example, the bicycle control devices of the bicycle component actuation apparatus 12 can have a rotary grip type user operating member. Also for example, the bicycle control devices of the bicycle component actuation apparatus 12 can have a sliding type user operating member.

In the illustrated embodiment, the first and second bicycle control devices 31 and 32 are electrically connected to the cycle computer 30 such that the cycle computer 30 receives detection signals from the first and second bicycle control devices 31 and 32 as discussed above. As explained later, in response to these detection signals, the cycle computer 30 executes a control program to actuate one or more of the electric components 14, 16, 18, 20, 22 and 24.

Referring now to FIGS. 6 to 9, the first user operating member 31 of the illustrated embodiment will now be discussed. Basically, depending on the user setting, the first user operating member 31 is used for gear shifting operations of a bicycle gear changing device, such as the front derailleur 14 and the rear derailleur 16, and/or for controlling non-shifting devices such as the front suspension 18, the rear suspension 20, the seat post 22 and the rotational resistance applying structure 24. The basic construction and operation of the first user operating member 31 is disclosed in Taiwanese Utility Model Patent No. M415103. Since the construction and operation of the first user operating member 31 is known, and the bicycle component actuation apparatus 12 can be used with other types of electric control devices, the first user operating member 31 will only be briefly discussed to understand its use in the bicycle component actuation apparatus 12 disclosed herein. Basically, the first user operating member 36 is movably (i.e., pivotally) mounted to the first base member 34 from the rest position R to the first operated position P1 and then to the second operated position P2 in that order with a single progressive movement of the first user operating member 36. In particular, the first user operating member 36 is pivotally mounted to the first base member 34 by a pivot pin 50.

The first base member 34 includes a handlebar mounting portion 34a that clamps to the handlebar 28 in a conventional manner. The first base member 34 further includes a support portion 34b that pivotally supports the first user operating member 36 via the pivot pin 50. The first user operating member 36 includes a cover 52 and an operating body 54. The cover 52 covers an outside surface of the operating body 54. The operating body 54 has a pair of cam slots 54a for receiving a cam follower 56. The operating body 54 has an interior space for receiving a part of the support portion 34b of the first base member 34. A biasing member 58 is operatively provided between the first base member 34 and the cam follower 56 to bias the first user operating member 36 towards the rest position R. The biasing member 58 is a coil spring, for example, which is arranged in a recess 34c of the support portion 34b of the first base member 34. The cam follower 56 is also slidably disposed in the recess 34c. The cam follower 56 slides in the cam slots 54a when the first user operating member 36 is pivoted such that the biasing member 58 is compressed. Thus, the first user operating member 36 is a trigger type of user operating member.

The movement detector SW1 basically includes a pair of first pins 60 and pin 62, a first elastic member 64 and a first switch element 65. The first pin 60 is depressed by the first user operating member 36 as the first user operating member 36 is pivoted from the rest position R towards the first operated position P1 or the second operated position P2. The first pins 60 and 62 are separated by the first elastic member 64 such that the first pin 62 contacts the first switch element 65 as the first user operating member 36 is pivoted from the rest position R to the first operated position P1. The first elastic member 64 is a coil spring, for example. The first elastic member 64 biases the first pins 60 and 62 to make them separate apart from each other.

The movement detector SW2 comprises a pair of second pins 66 and 68, a second elastic member 70 and a second switch element 72. The second pin 66 is depressed by the first user operating member 36 as the first user operating member 36 is pivoted from the first operated position P1 towards the second operated position P2. The second pins 66 and 68 are separated by the second switch element 72 by the second elastic member 70 such that the second pin 68 contacts the second switch element 72 as the first user operating member 36 is pivoted from the first operated position P1 to the second operated position P2. The second elastic member 70 is a coil spring, for example. The second elastic member 70 biases the second pins 66 and 68 to make them separate apart from each other.

Figure 9:
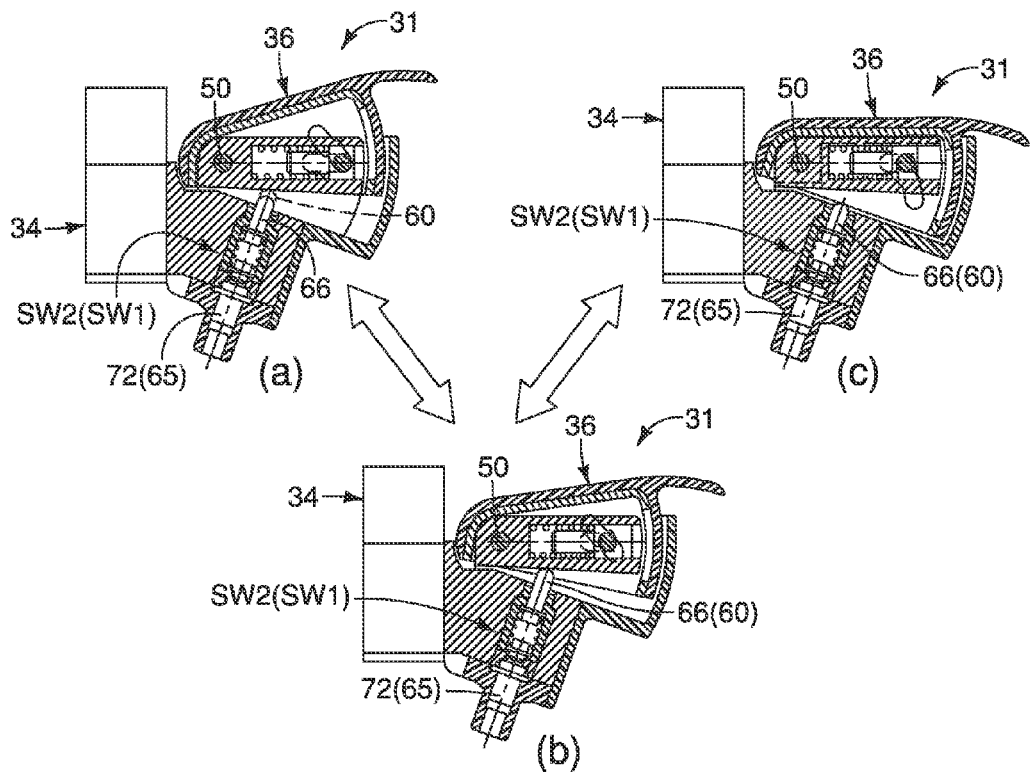
FIG. 9 is a series of cross sectional view of the bicycle control device illustrating the operation of the user operating member of the bicycle control device.

Referring to FIG. 9, the movement of the first user operating member 36 will now be discussed. The first user operating member 36 is depicted in the rest position R in portion (a) of FIG. 9. In portion (b) of FIG. 9, the first user operating member 36 is depicted in the first operated position P1. In portion (c) of FIG. 9, the first user operating member 36 is depicted in the second operated position P2. When the first user operating member 36 is depressed by a user overcoming the biasing force of the biasing member 58, the first user operating member 36 starts pivoting from the rest position R as shown in portion (a) of FIG. 9.

When the first user operating member 36 is pivoted, the cam follower 56 is moved along the cam slots 54a from a first end of the cam slots 54a towards a second end of the cam slots 54a. Meanwhile, the biasing member 58 is compressed. Upon the first user operating member 36 reaching the first operated position P1, as seen in portion (a) of FIG. 9, the first movement detector SW1 is closed to produce a detection signal. More specifically, the first pin 60 is depressed by the first user operating member 36 and descends to thereby compress the first elastic member 64 and move the first pin 62 into contact with the first switch element 65. As a result, the first switch element 65 is actuated. The detection signal is now sent to the controller 30, which outputs a first or second operation signal depending on how long the first user operating member 36 remains at the first operated position P1.

When the first user operating member 36 is further pivoted from the first operated position P1 (portion (b) of FIG. 9) towards the second operated position P2 (portion (c) of FIG. 9), the cam follower 56 is moved further along the cam slots 54a and the biasing member 58 is further compressed. Upon the first user operating member 36 reaching the second operated position P2, as seen in portion (c) of FIG. 9, the second movement detector SW2 is closed to produce the detection signal. More specifically, the second pin 66 is depressed by the first user operating member 36 and descends to thereby compress the second elastic member 70 and move the second pin 68 into contact with the second switch element 72. As a result, the second switch element 72 is actuated. The detection signal of the second switch element 72 is now sent to the controller 30, which outputs a third or fourth operation signal depending on how long the first user operating member 36 remains at the second operated position P2.

Preferably, once the second switch element 72 is actuated, the detection signal of the first switch element 65 blocked so that only the detection signal from the second switch element 72 is outputted to the controller 30. The first switch element 65 outputs first and second detection signals and the second switch element 72 outputs third and fourth detection signals when the controller 30 is set by the user to output an operation signal based on how long the first user operating member 36 remains at either the first operated position P1 or the second operated position P2. On the other hand, the first switch element 65 outputs first detection signal and the second switch element 72 outputs second detection signal when the controller 30 is set by the user to ignore how long the first user operating member 36 remains at either the first operated position P1 or the second operated position P2.

Figure 10:
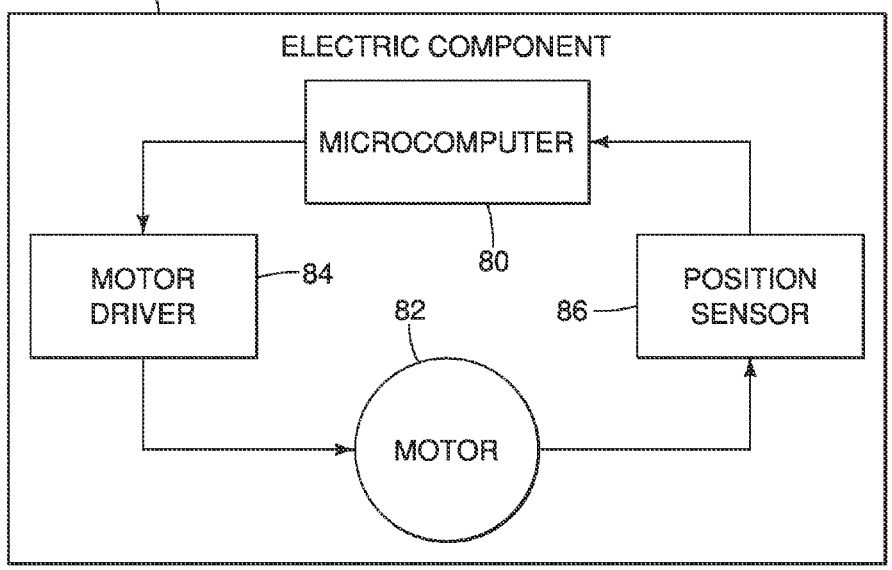
FIG. 10 is a simplified schematic diagram illustrating a basic configuration of each of the electric components that is actuated by the bicycle component actuation apparatus.

Referring now to FIG. 10, in the illustrated embodiment, each of the electric components 14, 16, 18, 20, 22 and 24 includes a microcomputer 80 and a reversible electric motor 82. The microcomputer 80 operates the motor 82 using a motor driver and based on a position signal from a position sensor 86. Of course, it will be apparent to those skilled in the bicycle field from this disclosure that the electric components 14, 16, 18, 20, 22 and 24 can have other configurations. Since a variety of configurations for the electric components 14, 16, 18, 20, 22 and 24 are known in the bicycle field, the precise configuration of the electric components 14, 16, 18, 20, 22 and 24 will not be discussed or illustrated in detail herein. Moreover, while the electric components 14, 16, 18, 20, 22 and 24 are illustrated as being connected by a voltage line, a ground line and a signal line to the controller 30 in FIG. 3, it will be apparent to those skilled in the bicycle field from this disclosure that communication between the electric components 14, 16, 18, 20, 22 and 24 and the controller 30 can be carried out by PLC (power line communications) through an electric power line.

The flow charts of FIGS. 11 to 16 will now be discussed. The flow charts of FIGS. 11 and 12 illustrate control programs that are used with bicycle control devices that have only one operated position, while the flow charts of FIGS. 13 to 16 illustrate control programs that are used with bicycle control devices that have two operated positions. Preferably, all of the control programs prestored in the memory 44 so that the user can select which of the control process is to be used for the type of bicycle control devices that are being used. Once the controller 30 is turned "on" and one of the control processes is selected, the controller 30 executes the selected control process on a continuous basis or in response to a wakeup signal produced by movement of one of the first and second user operating members 36 and 40. Preferably, for example, once the controller 30 is turned "on", electrical power is supplied to the electric components 14, 16, 18, 20, 22 and 24 and the first and second movement detectors SW1 and SW2 of each of the first and second bicycle control devices 31 and 32.

Figure 11:
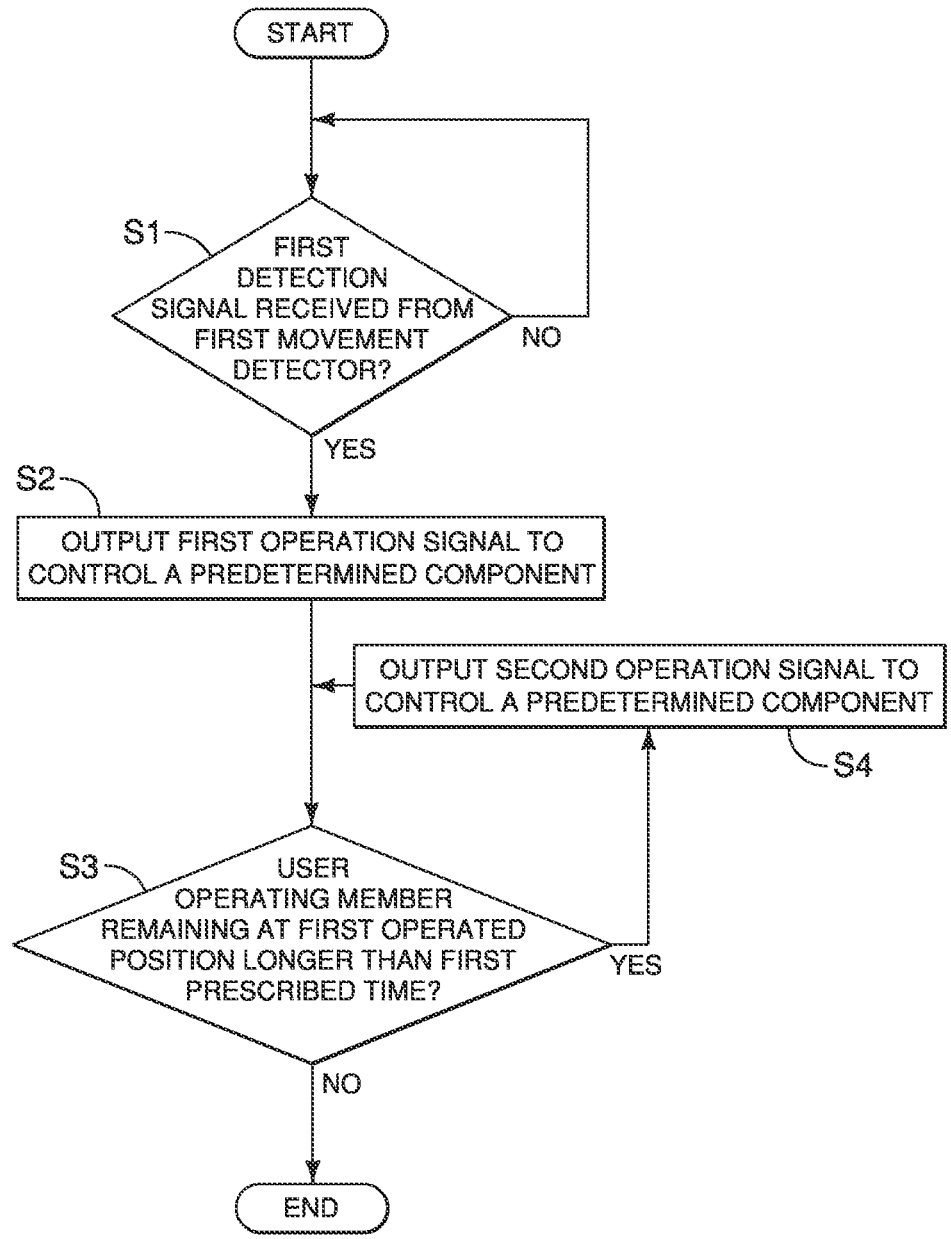
FIG. 11 is a first flow chart illustrating a first control process that is executed by the controller of the bicycle component actuation apparatus in response to the operation of one of the user operating members.

Referring now to the flow chart of FIG. 11, a first control process is illustrated that can be selected and then executed by the controller 30 in response to operation of one of the first and second user operating members 36 and 40. As mentioned above, this first control process will typically be used with bicycle control devices that have only one operated position. Thus, the controller 30 will only receive the first detection signals from the first movement detectors SW1 of the first and second bicycle control devices 31 and 32. In other words, during execution of this first control process, the controller 30 will ignore the second detection signals from the second movement detectors SW2 of the first and second bicycle control devices 31 and 32. Alternatively, bicycle control devices can be used that have only one operated position.

Using the first control process of FIG. 11, for example, the user can set the first bicycle control device 31 to control downshifting and unlocking one or both of the suspensions 18 and 20, and set the second bicycle control device 32 to control upshifting and locking one or both of the suspensions 18 and 20 (see, Example 1 below).

EXAMPLE 1

|  | First Operated Position Short Operation | First Operated Position Long Operation |
|---|---|---|
| First User Operating | Preform downshift by operating one or both of the | Change state one or both of the suspensions to a free |

|  | First Operated Position Short Operation | First Operated Position Long Operation |
|---|---|---|
| Member Second User Operating Member | derailleurs one shift stage Preform upshift by operating one or both of the derailleurs one shift stage | state (e.g., unlocked state) Change state one or both of the suspensions to a lockout state |

For the sake of simplicity, the first control process of the flow chart of FIG. 11 will only be discussed with respect to the operation of the first bicycle control device 31 and Example 1. Of course, the first control process can be used for controlling both the first and second bicycle control devices 31 and 32 by first determining which of the first and second bicycle control devices 31 and 32 has been operated.

In step S1, the controller 30 continuously checks to determine if the first detection signal has been received from the first movement detector SW 1. As mentioned above, the first detection signal is produced by the first movement detector SW1 upon detecting the first user operating member 36 has reached the first operated position P1. Once the first detection signal is received by the controller 30, the process proceeds to step S2.

In step S2, the controller 30 outputs the first operation signal to control a predetermined electric component based on the user settings that were previously stored in the memory 44. Depending on the configuration of the predetermined electric component, the first operation signal can be a command signal that is received by the microcomputer 80 of the predetermined electric component, or merely electricity (i.e., electrical signal) being supplied to the predetermined electric component. In the case of Example 1 above, the controller 30 outputs one or more first operation signals to perform a downshift by operating one or both of the derailleurs 14 and 16 in accordance with a shift table (not shown) in response the operation of the first user operating member 36. Of course, in the case of Example 1 above, the controller 30 outputs one or more first operation signals to perform an upshift by operating one or both of the derailleurs 14 and 16 in accordance with a shift table (not shown) in response the operation of the second user operating member 40. Then the process proceeds to step S3.

In step S3, the controller 30 then determines if the first user operating member 36 remains at the first operated position P1 for a period of time longer than a first prescribed time (e.g., 0.5 second). As mentioned above, the controller 30 received a first detection signal from the first movement detector SW1 upon the controller 30 detecting the user operating member 36 remains at the first operated position P1 for a period of time equal to or less than the first prescribed time. On the other hand, the controller 30 receives a second detection signal from the first movement detector SW1 upon the controller 30 detecting the user operating member 36 remains at the first operated position P1 for a period of time longer than the first prescribed time. In the illustrated embodiment, the first movement detector SW1 continuously sends electricity as an electrical signal to the controller 30 for as long as the first user operating member 36 remains depressed at the first operated position P1, or past the first operated position P1 with respect to the rest position R. Thus, the first and second operation signals are the same signal but outputted for different lengths of time. If the first user operating member 36 remains at the first operated position P1 for the prescribed time or longer, then the process proceeds to step S4.

In step S4, the controller 30 outputs the second operation signal to control a predetermined electric component based on the user settings that were previously stored in the memory 44. Again, depending on the configuration of the predetermined electric component, the second operation signal can be a command signal that is received by the microcomputer 80 of the predetermined electric component, or merely electricity (i.e., electrical signal) being supplied to the predetermined electric component. In the case of Example 1 above, the controller 30 outputs one or more second operation signals to change the state one or both of the suspensions 18 and 20 to a free state (e.g., unlocked state) in response the operation of the first user operating member 36. Of course, in the case of Example 1 above, the controller 30 outputs one or more second operation signals to change the state one or both of the suspensions 18 and 20 to a lockout state in response the operation of the second user operating member 40.

After the controller 30 outputs the second operation signal in step S4, the process returns to step S3 to determine if the user has released the first user operating member 36. Once the first user operating member 36 is released, and returns to the rest position R, the process will then return to the beginning and start again.

However, in the event, the first user operating member 36 remains at the first operated position P1 for a period of time much longer than the first prescribed time, the controller 30 will repeats steps S3 and S4 until the first user operating member 36 is released. As a result, the controller 30 will output the second operation signal for each period of time that first user operating member 36 remains at the first operated position P1 for a period of time longer than the first prescribed time. The microcomputer 80 of the predetermined electric component can be set to just ignore the additional operation signal from the first movement detector SW1 as the user holds the first user operating member 36 remains at the first operated position P1 for a period of time that is much longer than the first prescribed time. Alternatively, the microcomputer 80 of the predetermined electric component can be set to further change the state of one or both of the suspensions 18 and 20 to another one of the states (e.g., a high stiffness, a medium stiffness or a low stiffness) depending on the length of the time the first user operating member 36 remains at the first operated position P1. In either case, once the first user operating member 36 is released to return to the rest position R, the process will then return to the beginning and start again. Of course, in the case of Example 1 above, the controller 30 will operate in a similar manner when the user holds the second user operating member 40 at the first operated position P1' for a period of time that is much longer than the first prescribed time.

Figure 12:
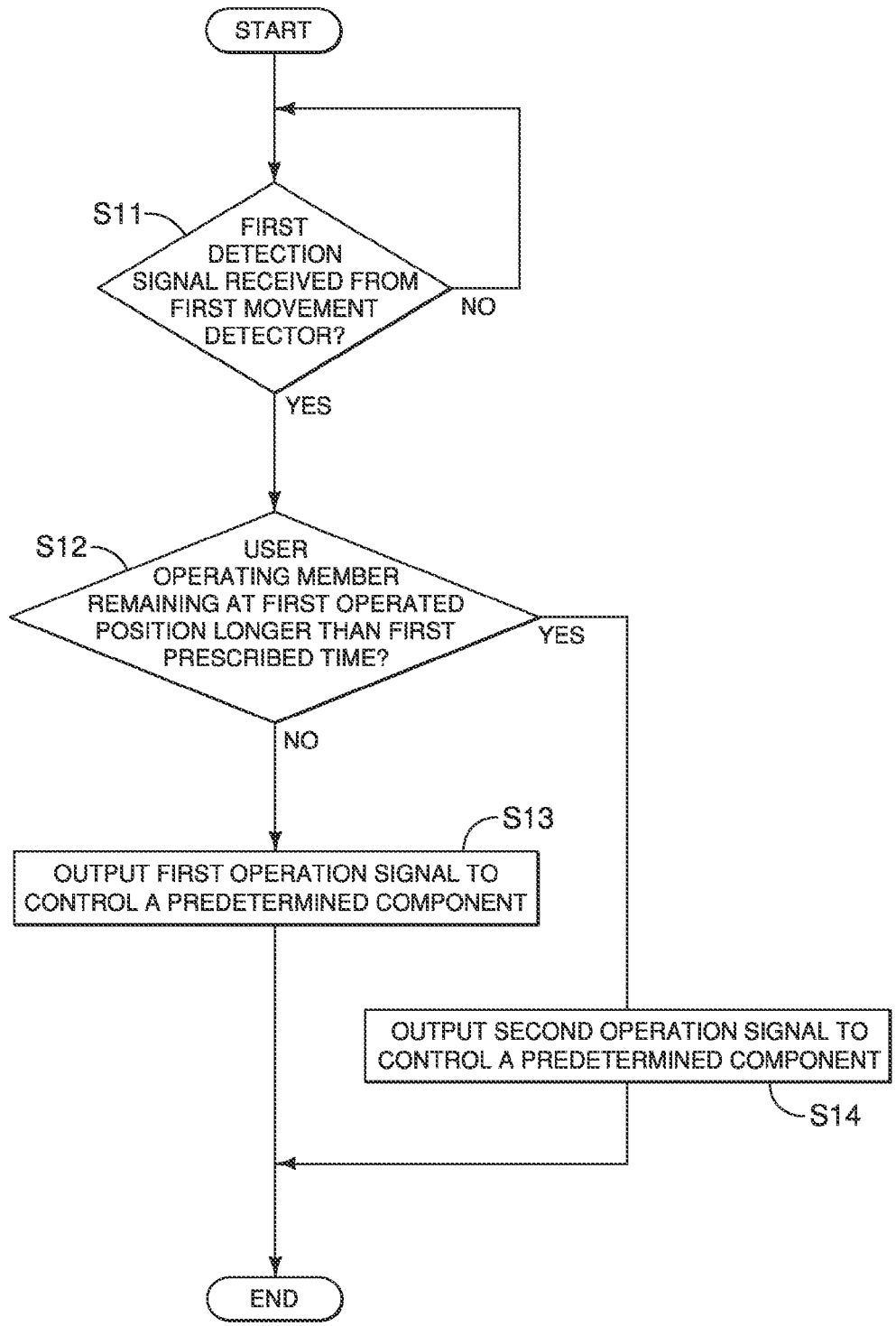
FIG. 12 is a second flow chart illustrating a second control process that is executed by the controller of the bicycle component actuation apparatus in response to the operation of one of the user operating members.

Referring now to the flow chart of FIG. 12, a second control process is illustrated that can be selected and then executed by the controller 30 in response to operation of one of the first and second user operating members 36 and 40. As mentioned above, this second control process will typically be used with bicycle control devices that have only one operated position. Thus, the controller 30 will only receive the first detection signals from the first movement detectors SW1 of the first and second bicycle control devices 31 and 32. In other words, during execution of this second control process, the controller 30 will ignore the second detection signals from the second movement detectors SW2 of the first and second bicycle control devices 31 and 32. Alternatively, bicycle control devices can be used that have only one operated position.

For the sake of simplicity, the second control process of the flow chart of FIG. 12 will only be discussed with respect to the operation of the first bicycle control device 31. Of course, the second control process can be used for controlling both the first and second bicycle control devices 31 and 32 by first determining which of the first and second bicycle control devices 31 and 32 has been operated.

In step S11, the controller 30 continuously checks to determine if the first detection signal has been received from the first movement detector SW1. As mentioned above, the first detection signal is produced by the first movement detector SW1 upon detecting the first user operating member 36 has reached the first operated position P1. Once the first detection signal is received by the controller 30, the process proceeds to step S12.

In step S12, the controller 30 then determines if the first user operating member 36 remains at the first operated position P1 for a period of time longer a first prescribed time (e.g., 0.5 second). The controller 30 receives the first detection signal from the first movement detector SW1 upon the controller 30 detecting the user operating member 36 remains at the first operated position P1 for a period of time equal to or less than the first prescribed time. On the other hand, the controller 30 receives the second detection signal from the first movement detector SW1 upon the controller 30 detecting the user operating member 36 remains at the first operated position P1 for a period of time longer than the first prescribed time. In the illustrated embodiment, the first movement detector SW1 continuously sends electricity as an electrical signal to the controller 30 for as long as the first user operating member 36 remains depressed at the first operated position P1, or past the first operated position P1 with respect to the rest position R. Thus, the first and second operation signals are the same signal but outputted for different lengths of time. If the first user operating member 36 does not remain at the first operated position P1 for the first prescribed time or longer, then the process proceeds to step S13. On the other hand, if the first user operating member 36 remains at the first operated position P1 for the first prescribed time or longer, then the process proceeds to step S14.

In step S13, the controller 30 outputs the first operation signal to control a predetermined electric component based on the user settings that were previously stored in the memory 44. Depending on the configuration of the predetermined electric component, the first operation signal can be a command signal that is received by the microcomputer 80 of the predetermined electric component, or merely electricity (i.e., electrical signal) being supplied to the predetermined electric component. After step S13, the process will then return to the beginning and start again.

In step S14, the controller 30 outputs the second operation signal to control a predetermined electric component based on the user settings that were previously stored in the memory 44. Again, depending on the configuration of the predetermined electric component, the second operation signal can be a command signal that is received by the microcomputer 80 of the predetermined electric component, or merely electricity (i.e., electrical signal) being supplied to the predetermined electric component. After step S14, the process will then return to the beginning and start again.

Figure 13:
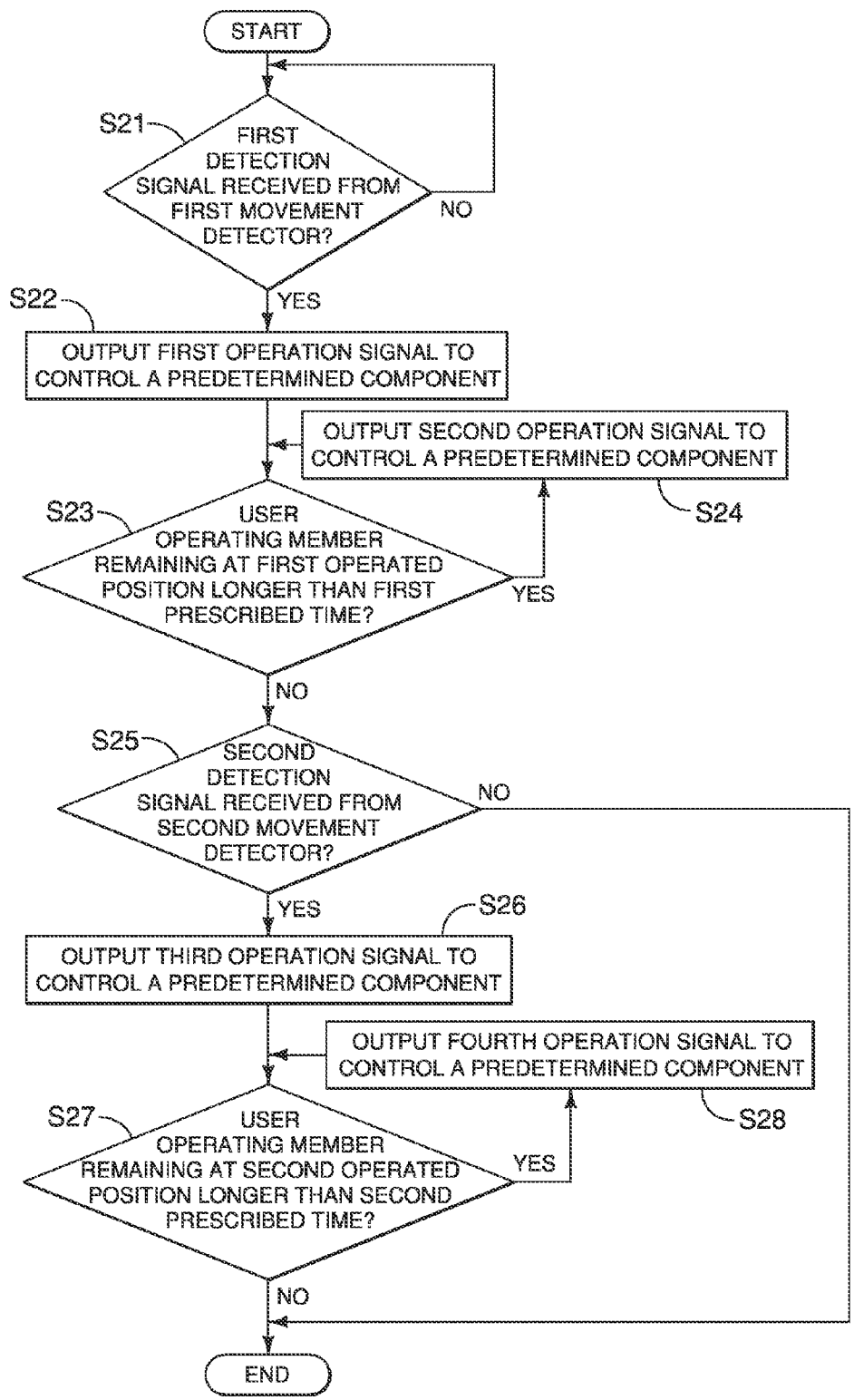
FIG. 13 is a third flow chart illustrating a third control process that is executed by the controller of the bicycle component actuation apparatus in response to the operation of one of the user operating members.

Referring now to the flow chart of FIG. 13, a third control process is illustrated that can be selected and then executed by the controller 30 in response to operation of one of the first and second user operating members 36 and 40. As mentioned above, this third control process will typically be used with bicycle control devices that have two operated positions. Thus, the controller 30 will receive both the first and second detection signals from the first and second movement detectors SW1 and SW2 of the first and second bicycle control devices 31 and 32.

Using the third control process of FIG. 13, for example, the user can set the first bicycle control device 31 to control downshifting and changing an operating state of one or both of the suspensions 18 and 20, and set the second bicycle control device 32 to control upshifting and changing an operating state of the one or both of the suspensions 18 and 20 (see, Example 2 below).

EXAMPLE 2

|  | Short Operation of First User Operating Member | Long Operation of First User Operating Member |
|---|---|---|
| First Operated Position | Preform downshift by operating one or both of the derailleurs one shift stage | Preform additional downshifts by operating one or both of the derailleurs based on the length of time of the operation |
| Second Operated Position | Change state one or both of the suspensions to a free state (e.g., unlocked state) | Change state one or both of the suspensions to next state based on the length of time of the operation |

|  | Short Operation of Second User Operating Member | Long Operation of Second User Operating Member |
|---|---|---|
| First Operated Position | Preform upshift by operating one or both of the derailleurs one shift stage | Preform additional upshifts by operating one or both of the derailleurs based on the length of time of the operation |
| Second Operated Position | Change state one or both of the suspensions to a lockout state | Change state one or both of the suspensions to next state based on the length of time of the operation |

For the sake of simplicity, the third control process of the flow chart of FIG. 13 will only be discussed with respect to the operation of the first bicycle control device 31 and Example 2. Of course, the third control process can be used for controlling both the first and second bicycle control devices 31 and 32 by first determining which of the first and second bicycle control devices 31 and 32 has been operated.

In this third control process, steps S21 to S24 are the same as steps S1 to S4 of FIG. 11 as discussed above. However, in Example 2, the electric component that is operated by the long position operations is different. In particular, in Example 1, the long position operations at the first operated position P1 or P1' change the state of one or both of the suspensions, while the long position operations at the first operated position P1 or P1' perform additional shifting operations in Example 2. For the sake of brevity, the descriptions of the steps S21 to S24 will not be repeated.

After step S23, the control process proceeds to step S25. In step S25, the controller 30 checks to determine if the second detection signal is received from the second movement detector SW2. As mentioned above, the second detection signal is produced by the second movement detector SW2 upon detecting the first user operating member 36 has reached the second operated position P2.

In step S25, if the controller 30 does not receive the second detection signal, then the process proceeds ends and then returns to the beginning again. On the other hand, if the controller 30 receives the second detection signal, then the process proceeds to step S26.

In step S26, the controller 30 outputs the third operation signal to control a predetermined electric component based on the user settings that were previously stored in the memory 44. Depending on the configuration of the predetermined electric component, the third operation signal can be a command signal that is received by the microcomputer 80 of the predetermined electric component, or merely electricity (i.e., electrical signal) being supplied to the predetermined electric component. After step S26, the process proceeds to step S27.

In step S27, the controller 30 then determines if the first user operating member 36 remains at the second operated position P2 for a period of time longer the second prescribed time (e.g., 0.5 second). The controller 30 receives a third detection signal from the second movement detector SW2 upon the controller 30 detecting the user operating member 36 remains at the second operated position P2 for a period of time equal to or less than the second prescribed time. On the other hand, the controller 30 receives a fourth detection signal from the second movement detector SW2 upon the controller 30 detecting the first user operating member 36 remains at the second operated position P2 for a period of time longer than the second prescribed time.

In step S28, the controller 30 only outputs the fourth operation signal to control a predetermined electric component based on the user settings that were previously stored in the memory 44. Again, depending on the configuration of the predetermined electric component, the fourth operation signal can be a command signal that is received by the microcomputer 80 of the predetermined electric component, or merely electricity (i.e., electrical signal) being supplied to the predetermined electric component. After step S28, the process returns to step S27, discussed above, such that the controller 30 repeats outputting the fourth operation signal for each period of time that the first user operating member 36 remains at the second operated position P1 for a period of time longer than the second prescribed time. Thus, if the first user operating member 36 does not remain at the second operated position P2 for the second prescribed time or longer, then the process proceeds ends and then returns to the beginning again. On the other hand, if the first user operating member 36 remains at the second operated position P2 for the second prescribed time or longer, then the process proceeds back to step S28.

In the illustrated embodiment, the first and second movement detectors SW1 and SW2 continuously sends electricity as the third and fourth detection signals, respectively, to the controller 30 for as long as the first user operating member 36 remains depressed at the second operated position P2. Thus, the first and second operation signals are the same signals as the third and fourth detection signals but outputted for different lengths of time.

In the case of Example 2 above, with the third control process of the flow chart of FIG. 13, the controller 30 selectively outputs the first to fourth operation signals based on the length of the stroke (i.e., the pushing amount in the illustrated embodiment) of the first and second user operating members 36 and 40, and the amount of time that the first and second user operating members 36 and 40 are each operated.

Here, in Example 2 above, with the third control process of the flow chart of FIG. 13, the first operation signal corresponds to either the first user operating member 36 or the second user operating member 40 being pushed to the first operated position P1 or P1' for a period of time equal to or less than the first prescribed time. In the case of the first user operating member 36, a downshift is performed by operating one or both of the derailleurs 14 and 16 one shift stage in accordance with a prestored shift schedule in response to receiving the first operation signal. In the case of the second user operating member 40, an upshift is performed by operating one or both of the derailleurs 14 and 16 one shift stage in accordance with a prestored shift schedule in response to receiving the first operation signal.

Here, in Example 2 above, with the third control process of the flow chart of FIG. 13, the second operation signal corresponds to either the first user operating member 36 or the second user operating member 40 being pushed to the first operated position P1 or P1' for a period of time longer than the first prescribed time. In the case of the first user operating member 36, additional downshifts are performed by operating one or both of the derailleurs 14 and 16 one shift stage in accordance with a prestored shift schedule based on the length of time of the operation in response to receiving the second operation signal. In the case of the second user operating member 40, additional upshifts are performed by operating one or both of the derailleurs 14 and 16 one shift stage in accordance with a prestored shift schedule based on the length of time of the operation in response to receiving the second operation signal.

Here, in Example 2 above, with the third control process of the flow chart of FIG. 13, the third operation signal corresponds to either the first user operating member 36 or the second user operating member 40 being pushed to the second operated position P2 or P2' for a period of time equal to or less than the second prescribed time. In the case of the first user operating member 36, a state one or both of the suspensions 18 and 20 is changed to a free state (e.g., unlocked state) in response to receiving the third operation signal. In the case of the second user operating member 40, a state one or both of the suspensions is changed to a lockout state in response to receiving the third operation signal.

Here, in Example 2 above, with the third control process of the flow chart of FIG. 13, the fourth operation signal corresponds to either the first user operating member 36 or the second user operating member 40 being pushed to the second operated position P2 or P2' for a period of time longer than the second prescribed time. In the case of the first user operating member 36, a state one or both of the suspensions is changed to next state based on the length of time of the operation in response to receiving the fourth operation signal. In the case of the second user operating member 40, a state one or both of the suspensions is changed to next state based on the length of time of the operation in response to receiving the fourth operation signal.

Figure 14:
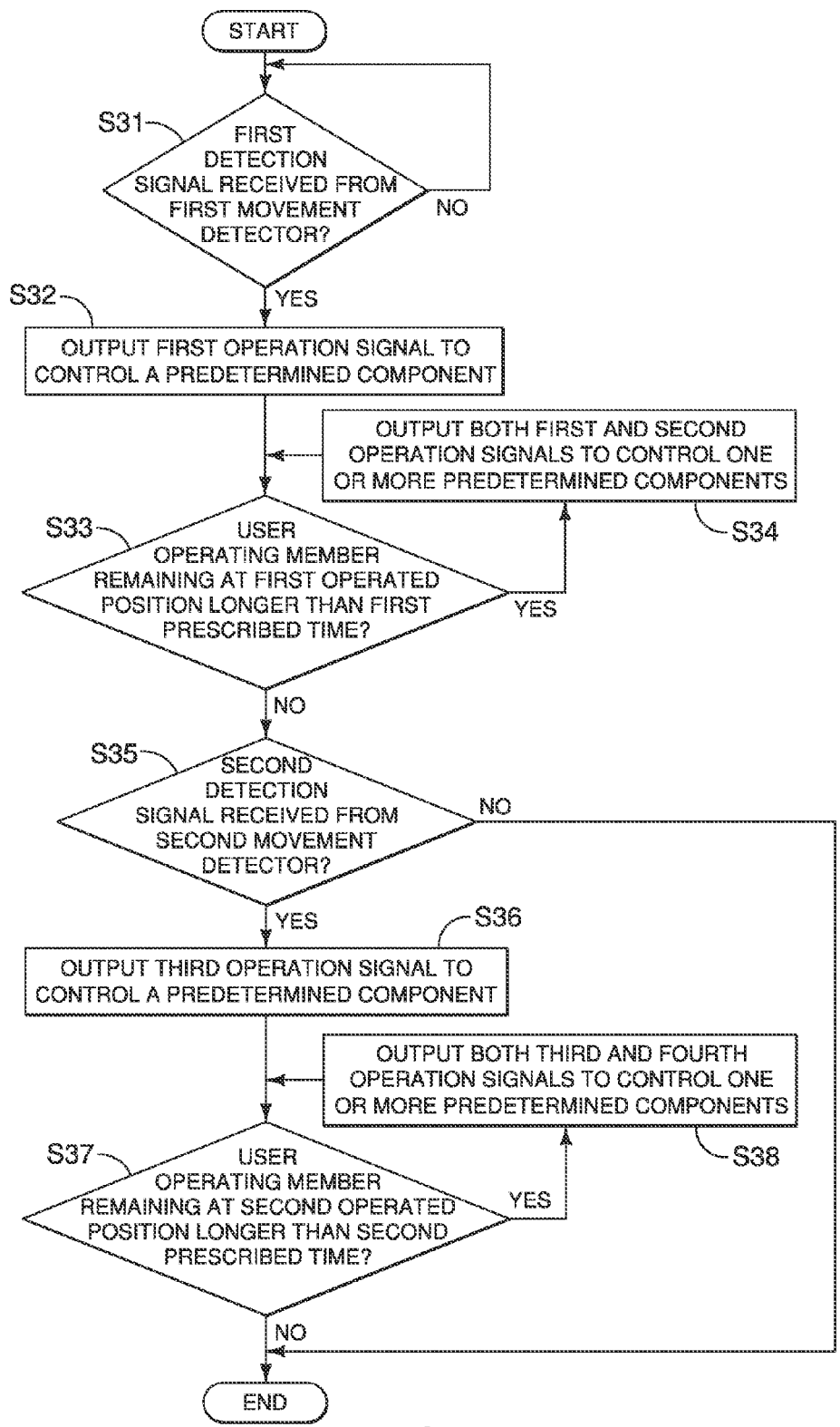
FIG. 14 is a fourth flow chart illustrating a fourth control process that is executed by the controller of the bicycle component actuation apparatus in response to the operation of one of the user operating members.

Referring now to the flow chart of FIG. 14, a fourth control process is illustrated that can be selected and then executed by the controller 30 in response to operation of one of the first and second user operating members 36 and 40. As mentioned above, this fourth control process will typically be used with bicycle control devices that have two operated positions. Thus, the controller 30 will receive both the first and second detection signals from the first and second movement detectors SW1 and SW2 of the first and second bicycle control devices 31 and 32. However, in this fourth control process the first and second switch elements 65 and 72 are configure such that once the second switch element 72 is depressed, the detection signal In this fourth control process, steps S31 to S33 and steps S35 to S37 are the same as steps S21 to S23 and steps S25 to S27 of the third control process of FIG. 13 as discussed above. The only difference between the third and fourth control processes are steps S24 and S28 of the third control process and steps S34 and S38 of the fourth control process. For the sake of brevity, the descriptions of steps S31 to S33 and steps S35 to S37 will not be repeated.

In step S33, if the controller 30 determines the first user operating member 36 remains at the first operated position P1 for a period of time longer than a first prescribed time (e.g., 0.5 second), then the process proceeds to step S34.

In step S34, the controller 30 outputs both the first and second operation signals to control one or more predetermined electric components based on the user settings that were previously stored in the memory 44. For example, if the first operation signal is set by the user to control one of first and second electric components and the second operation signal is set by the user to control the other of first and second electric components, then in this fourth control process the controller 30 operates both of the first and second electric components upon the controller 30 detecting the user operating member 36 remaining at the first operated position P1 for a period of time longer than the first prescribed time.

In step S38, the controller 30 outputs both the third and fourth operation signals. If the third operation signal is set by the user to control one of first and second electric components and the fourth operation signal is set by the user to control the other of first and second electric components, then in this fourth control process the controller 30 operates both of the first and second electric components upon the controller 30 detecting the user operating member 36 remaining at the second operated position P2 for a period of time longer than the second prescribed time.

Figure 15:
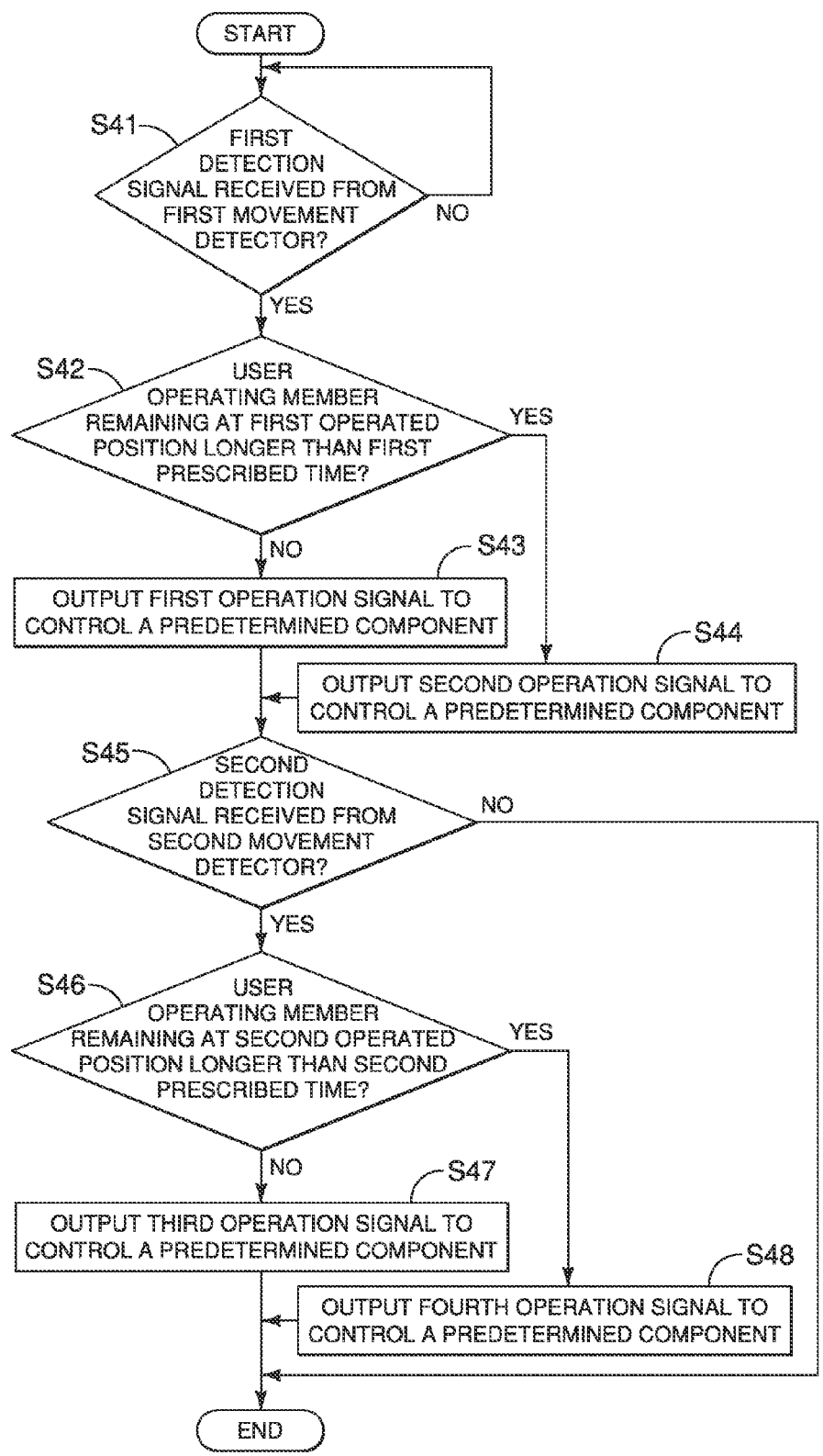
FIG. 15 is a fifth flow chart illustrating a fifth control process that is executed by the controller of the bicycle component actuation apparatus in response to the operation of one of the user operating members.

Referring now to the flow chart of FIG. 15, a fifth control process is illustrated that can be selected and then executed by the controller 30 in response to operation of one of the first and second user operating members 36 and 40. As mentioned above, this fifth control process will typically be used with bicycle control devices that have two operated positions. Thus, the controller 30 will receive both the first and second detection signals from the first and second movement detectors SW1 and SW2 of the first and second bicycle control devices 31 and 32.

For the sake of simplicity, the fifth control process of the flow chart of FIG. 15 will only be discussed with respect to the operation of the first bicycle control device 31. Of course, the fifth control process can be used for controlling both the first and second bicycle control devices 31 and 32 by first determining which of the first and second bicycle control devices 31 and 32 has been operated.

In this fifth control process, steps S41 to S44 are the same as steps S11 to S14 of the second control process, and step S45 is the same as step S25 of the third control process. For the sake of brevity, the descriptions of the steps S41 to S45 will not be repeated.

In step S45, if the controller 30 receives the second detection signal, then the process proceeds to step S46. In step S46, the controller 30 then determines if the first user operating member 36 remains at the second operated position P2 for a period of time longer the second prescribed time (e.g., 0.5 second). If the controller 30 detects the user operating member 36 remains at the second operated position P2 for a period of time longer than the second prescribed time, then the process proceeds to step S47 where the controller 30 only outputs the third operation signal to control a predetermined electric component based on the user settings that were previously stored in the memory 44. On the other hand, if the controller 30 detects the first user operating member 36 remains at the second operated position P2 for a period of time equal to or less than the second prescribed time, then the process proceeds to step S48 where the controller 30 only outputs the fourth operation signal to control a predetermined electric component based on the user settings that were previously stored in the memory 44.

Figure 16:
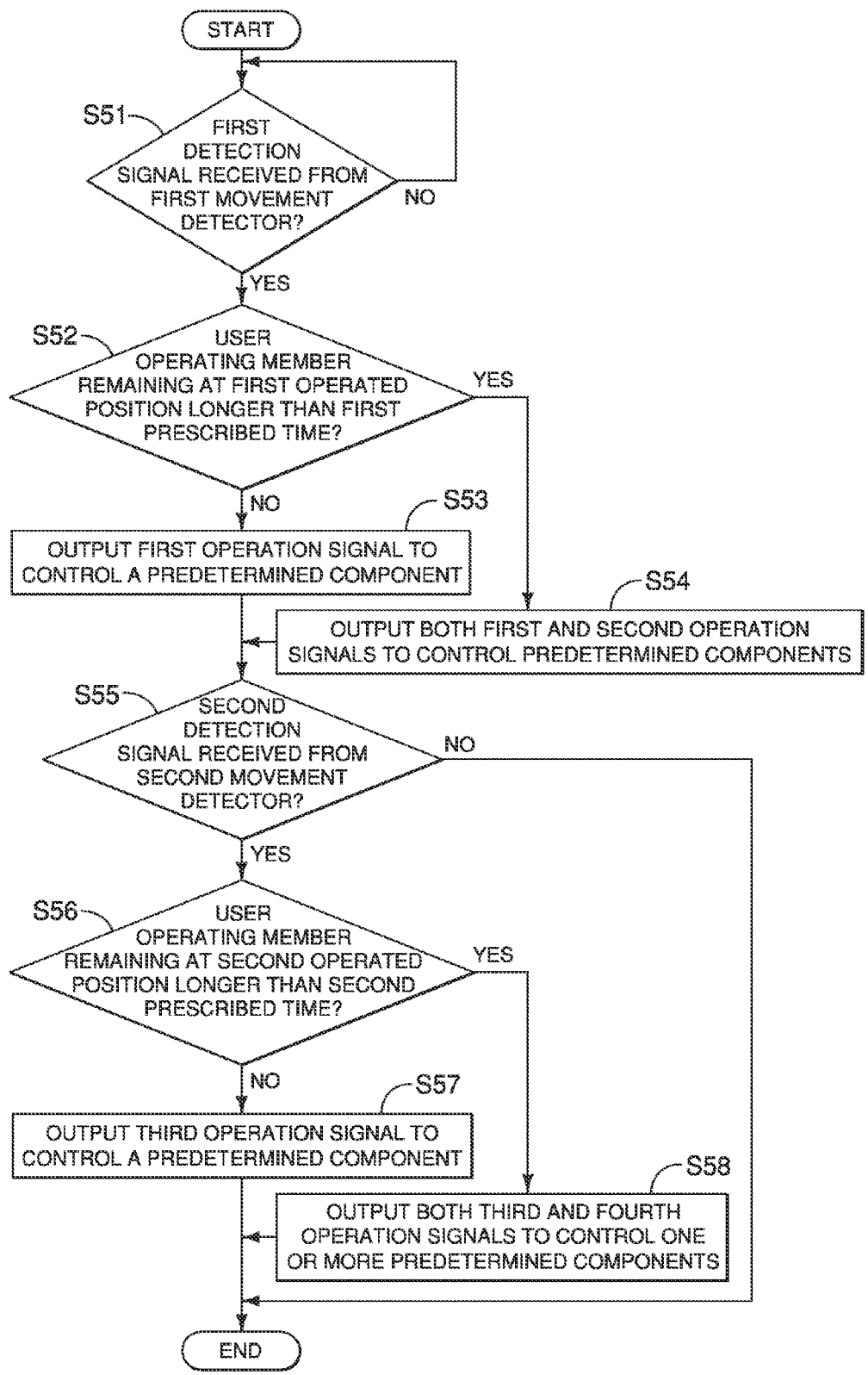
FIG. 16 is a sixth flow chart illustrating a sixth control process that is executed by the controller of the bicycle component actuation apparatus in response to the operation of one of the user operating members.

Referring now to the flow chart of FIG. 16, a sixth control process is illustrated that can be selected and then executed by the controller 30 in response to operation of one of the first and second user operating members 36 and 40. As mentioned above, this sixth control process will typically be used with bicycle control devices that have two operated positions. Thus, the controller 30 will receive both the first and second detection signals from the first and second movement detectors SW1 and SW2 of the first and second bicycle control devices 31 and 32.

In this sixth control process, the steps S51 to S53 and S55 to S57 are the same as steps S41 to S43 and S45 to S47 of the fifth control process. The only difference between the fifth and sixth control processes are steps S44 and S49 of the fifth control process and steps S54 and S58 of the sixth control process. For the sake of brevity, the descriptions of the steps S51 to S53 and S55 to S57 will not be repeated.

In step S54, the controller 30 outputs both the first and second operation signals to control one or more predetermined electric components based on the user settings that were previously stored in the memory 44. If the first operation signal is set by the user to control one of first and second electric components and the second operation signal is set by the user to control the other of first and second electric components, then in this sixth control process the controller 30 operates both of the first and second electric components upon the controller 30 detecting the user operating member 36 remaining at the first operated position P1 for a period of time longer than the first prescribed time.

In step S58, the controller 30 outputs both the third and fourth operation signals to control one or more predetermined electric components based on the user settings that were previously stored in the memory 44. If the third operation signal is set by the user to control one of first and second electric components and the fourth operation signal is set by the user to control the other of first and second electric components, then in this sixth control process the controller 30 operates both of the first and second electric components upon the controller 30 detecting the user operating member 36 remaining at the second operated position P2 for a period of time longer than the second prescribed time.

Figure 17:
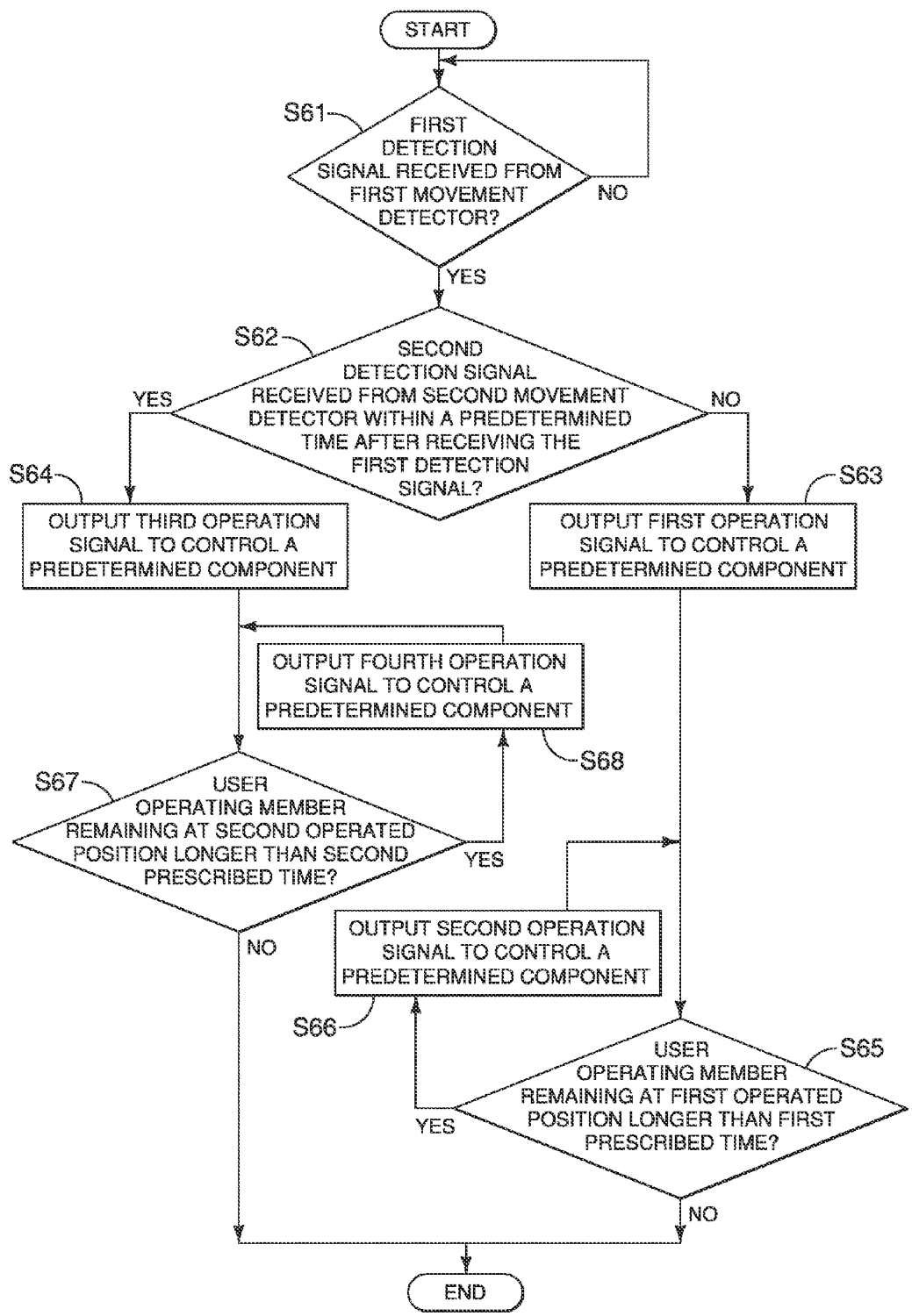
FIG. 17 is a seventh flow chart illustrating a seventh control process that is executed by the controller of the bicycle component actuation apparatus in response to the operation of one of the user operating members.

Referring now to the flow chart of FIG. 17, a seventh control process is illustrated that can be selected and then executed by the controller 30 in response to operation of one of the first and second user operating members 36 and 40. As mentioned above, this seventh control process will typically be used with bicycle control devices that have two operated positions. Thus, the controller 30 will receive both the first and second detection signals from the first and second movement detectors SW1 and SW2 of the first and second bicycle control devices 31 and 32.

In step S61, the controller 30 continuously checks to determine if the first detection signal has been received from the first movement detector SW1. As mentioned above, the first detection signal is produced by the first movement detector SW1 upon detecting the first user operating member 36 has reached the first operated position P1. Once the first detection signal is received by the controller 30, the process proceeds to step S62.

In step S62, the controller 30 continuously checks to determine if the second detection signal has been received from the second movement detector SW2 within a predetermined time (e.g., 0.5 second) after receiving the first detection signal. As mentioned above, the second detection signal is produced by the second movement detector SW2 upon detecting the first user operating member 36 has reached the second operated position P2.

If the second detection signal is not received by the controller 30 within the predetermined time after receiving the first detection signal, then the process proceeds to step S63. In step S63, the controller 30 outputs the first operation signal to control a predetermined electric component based on the user settings that were previously stored in the memory 44.

On the other hand, if the second detection signal is received by the controller 30 within the predetermined time after receiving the first detection signal, then the process proceeds to step S64. In step S64, the controller 30 outputs the third operation signal to control a predetermined electric component based on the user settings that were previously stored in the memory 44.

From step S63, the process proceeds to step S65, where the controller 30 determines if the first user operating member 36 remains at the first operated position P1 for a period of time longer a first prescribed time (e.g., 0.5 second). If the controller 30 detects the user operating member 36 remains at the first operated position P1 for a period of time longer than the first prescribed time, then the process proceeds to step S66. In step S66, the controller 30 outputs the second operation signal to control a predetermined electric component based on the user settings that were previously stored in the memory 44. If the controller 30 detects the user operating member 36 remains at the first operated position P1 for a period of time equal to or less than the first prescribed time, then the process ends and return to the beginning to start again.

From step S64, the process proceeds to step S67, where the controller 30 determines if the first user operating member 36 remains at the second operated position P2 for a period of time longer a second prescribed time (e.g., 0.5 second). If the controller 30 detects the user operating member 36 remains at the second operated position P2 for a period of time longer than the second prescribed time, then the process proceeds to step S67. In step S66, the controller 30 outputs the fourth operation signal to control a predetermined electric component based on the user settings that were previously stored in the memory 44. If the controller 30 detects the user operating member 36 remains at the second operated position P2 for a period of time equal to or less than the second prescribed time, then the process ends and return to the beginning to start again.

In this way, in the seventh control process, the controller 30 can output the first operation signal and/or the second operation signal upon the controller 30 detecting the user operating member 36 has been moved to the first operated position P1, and can output the third operation signal and/or the fourth operation signal without outputting the first and second operation signals upon the controller 30 detecting the user operating member 36 have been moved to the second operated position P2.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately"

as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component actuation apparatus comprising:
a base member;
a user operating member movably mounted to the base member from a rest position to a first operated position; and
a controller detecting operation of the user operating member to operate first and second electric components, one of which is not a shifting device,
the controller operating one of the first and second electric components upon the controller detecting the user operating member being moved to the first operated position,
the controller operating at least the other of the first and second electric components upon the controller detecting the user operating member remaining at the first operated position for a period of time longer than a first prescribed time.

2. The bicycle component actuation apparatus according to claim 1, wherein
the controller operates both of the first and second electric components upon the controller detecting the user operating member remaining at the first operated position for a period of time longer than the first prescribed time.

3. The bicycle component actuation apparatus according to claim 1, wherein
the controller operates only the other of the first and second electric components upon the controller detecting the user operating member remaining at the first operated position for a period of time longer than the first prescribed time.

4. The bicycle component actuation apparatus according to claim 1, wherein
the controller includes a user input to adjust the first prescribed time, and a memory that stores user settings of the first prescribed time.

5. The bicycle component actuation apparatus according to claim 1, further comprising
a movement detector mounted to at least one of the base member and the user operating member to detect operation of the user operating member,
the controller receives a first detection signal from the movement detector upon the movement detector detects the user operating member has been moved from the rest position to the first operated position.

6. The bicycle component actuation apparatus according to claim 5, wherein
the controller receives a second detection signal from the movement detector upon the controller detecting the user operating member remaining at the first operated position for a period of time longer than a first prescribed time.

7. The bicycle component actuation apparatus according to claim 6, wherein
the first detection signal and the second detection signal are same signal.

8. The bicycle component actuation apparatus according to claim 1, wherein
the user operating member is further movably mounted to the base member from the rest position to the first operated position and then to a second operated position in that order with a single progressive movement of the user operating member.

9. The bicycle component actuation apparatus according to claim 8, further comprising
a movement detector mounted to at least one of the base member and the user operating member to detect operation of the user operating member,
the controller receives a first detection signal from the movement detector upon the movement detector detects the user operating member has been moved from the rest position to the first operated position,
the controller receives a second detection signal from the movement detector upon the controller detecting the user operating member remaining at the first operated position for a period of time longer than a first prescribed time,
the controller receives a third detection signal from the movement detector upon detecting the user operating member has been moved from the first operated position to the second operated position.

10. The bicycle component actuation apparatus according to claim 9, wherein
the controller outputs one of a first operation signal and a second operation signal upon receiving the first detection signal, and outputs other of the first and the second operation signals upon receiving the second detection signal.

11. The bicycle component actuation apparatus according to claim 10, wherein
the controller outputs a third operation signal upon receiving the third detection signal.

12. The bicycle component actuation apparatus according to claim 11, wherein
the controller receives a fourth detection signal from the movement detector upon the controller detecting the user operating member remaining at the second operated position for a period of time longer than a second prescribed time.

13. The bicycle component actuation apparatus according to claim 12, wherein
the controller outputs a fourth operation signal upon receiving the fourth detection signal.

14. The bicycle component actuation apparatus according to claim 6, wherein
the controller shifts an electric gear changing device by outputting one of a first operation signal and a second operation signal, and the controller changes a setting of at least one of a bicycle suspension, a height adjustable seat post and a rotational resistance applying structure of a rear derailleur by outputting the other of the first operation signal and the second operation signal.

15. The bicycle component actuation apparatus according to claim 6, wherein
the controller changes a setting of one of a bicycle suspension, a height adjustable seat post and a rotational resistance applying structure of a rear derailleur as the one of the first and second electric components which is not the shifting device.

16. The bicycle component actuation apparatus according to claim 6, wherein
the controller shifts a gear changing device as the other of the first and second electric components.

17. A bicycle component actuation apparatus comprising:
a base member;
a user operating member movably mounted to the base member from a rest position to a first operated position and then to a second operated position in that order with a single progressive movement of the user operating member; and
a controller detecting operation of the user operating member to output first and second operation signals,
the controller outputting a first operation signal upon the controller detecting the user operating member being moved to the first operated position,
the controller outputting a second operation signal upon the controller detecting the user operating member remaining at the first operated position for a period of time longer than a first prescribed time, and
the controller outputting a third operation signal upon the controller detecting the user operating member being moved to the second operated position.

18. The bicycle component actuation apparatus according to claim 17, wherein
the controller includes a user input to set an amount of movement of a gear changing device based on at least one of the first, second and third operation signals, and memory that stores user settings of the first, second and third operation signals.

19. The bicycle component actuation apparatus according to claim 17, wherein
the controller includes a user input to adjust the first prescribed time, and memory that stores user settings of the first prescribed time.

20. The bicycle component actuation apparatus according to claim 17, wherein
the controller changes a setting of at least one of an electric gear changing device, a bicycle suspension, a height adjustable seat post and a rotational resistance applying structure of a rear derailleur by outputting at least one of the first, second and third operation signals.

21. The bicycle component actuation apparatus according to claim 17, wherein
the controller repeats outputting the second operation signal for each period of time that the user operating member remains at the first operated position for a period of time longer than the first prescribed time.

22. The bicycle component actuation apparatus according to claim 21, wherein
the controller includes a user input to adjust the first prescribed time, and memory that stores user settings of the first prescribed time.

23. The bicycle component actuation apparatus according to claim 17, wherein
the controller outputs a fourth operation signal upon the user operating member remains at the second operated position for longer than a second prescribed time.

24. The bicycle component actuation apparatus according to claim 17, wherein
the controller changes a setting of at least one of an electric gear changing device, a bicycle suspension, a height adjustable seat post and a rotational resistance applying structure of a rear derailleur by outputting the first or second operation signal.

25. The bicycle component actuation apparatus according to claim 24, wherein
the controller changes a setting of at least one of an electric gear changing device, a bicycle suspension, a height adjustable seat post and a rotational resistance applying structure of a rear derailleur by outputting the fourth operation signal.

26. The bicycle component actuation apparatus according to claim 23, wherein
the controller includes a user input to adjust the second prescribed time, and memory that stores user settings of the second prescribed time.

27. The bicycle component actuation apparatus according to claim 23, wherein
the controller repeats outputting the fourth operation signal for each period of time that the user operating member remains at the second operated position for the second prescribed time.

28. A bicycle component actuation apparatus comprising:
a base member;
a user operating member movably mounted to the base member from a rest position to a first operated position; and
a controller detecting operation of the user operating member to operate first and second electric components,
the controller operating one of the first and second electric components upon the controller detecting the user operating member remaining at the first operated position for a period of time equal to or less a prescribed time,
the controller operating at least the other of the first and second electric components upon the controller detecting the user operating member remaining at the first operated position for a period of time longer than the prescribed time.

29. The bicycle component actuation apparatus according to claim 28, wherein
the one of first and second electric components is not a shifting device.

30. The bicycle component actuation apparatus according to claim 28, wherein
each of the first and second electric components is a shifting device.

31. A bicycle component actuation apparatus comprising:
a base member;
a user operating member movably mounted to the base member from a rest position to a first operated position and then to a second operated position in that order with a single progressive movement of the user operating member; and
a controller detecting operation of the user operating member to output first and second operation signals,
the controller outputting a first operation signal upon the controller detecting the user operating member remaining at the first operated position for a period of time equal to or less a first prescribed time,
the controller outputting a second operation signal upon the controller detecting the user operating member remaining at the first operated position for a period of time longer than the first prescribed time, and the controller outputting a third operation signal upon the controller detecting the user operating member being moved to the second operated position.

32. A bicycle component actuation apparatus comprising:
a base member;
a user operating member movably mounted to the base member from a rest position to a first operated position and then to a second operated position in that order with a single progressive movement of the user operating member; and
a controller detecting operation of the user operating member to operate first and second electric components,
the controller selectively outputting a first operation signal to one of the first and second electric components upon the controller detecting the user operating member being moved to the first operated position and a third operation signal to the other of the first and second electric components without outputting the first operation signal upon the controller detecting the user operating member being moved to the second operated position.

33. The bicycle component actuation apparatus according to claim 32, wherein
the controller operates one of a front derailleur and a rear derailleur as the first electric component, and operates the other of the front and rear derailleurs as the second electric component.

* * * * *